(12) United States Patent
Hishinuma

(10) Patent No.: US 9,924,163 B2
(45) Date of Patent: Mar. 20, 2018

(54) IMAGE PROCESSING APPARATUS AND IMAGE PROCESSING METHOD

(71) Applicant: SONY CORPORATION, Tokyo (JP)

(72) Inventor: Sinsuke Hishinuma, Tokyo (JP)

(73) Assignee: SONY CORPORATION, Tokyo (JP)

( * ) Notice: Subject to any disclaimer, the term of this patent is extended or adjusted under 35 U.S.C. 154(b) by 216 days.

(21) Appl. No.: 14/197,869

(22) Filed: Mar. 5, 2014

(65) Prior Publication Data

US 2014/0307772 A1 Oct. 16, 2014

(30) Foreign Application Priority Data

Apr. 12, 2013 (JP) ................................. 2013-083453

(51) Int. Cl.
| | |
|---|---|
| *H04N 19/86* | (2014.01) |
| *H04N 19/117* | (2014.01) |
| *H04N 19/176* | (2014.01) |
| *H04N 19/14* | (2014.01) |
| *H04N 19/82* | (2014.01) |

(52) U.S. Cl.
CPC ..... *H04N 19/00066* (2013.01); *H04N 19/117* (2014.11); *H04N 19/14* (2014.11); *H04N 19/176* (2014.11); *H04N 19/86* (2014.11); *H04N 19/82* (2014.11)

(58) Field of Classification Search
CPC ...... H04N 19/80; H04N 19/82; H04N 19/117; H04N 19/439
See application file for complete search history.

(56) References Cited

U.S. PATENT DOCUMENTS

| | | | | |
|---|---|---|---|---|
| 5,537,635 A | * | 7/1996 | Douglas | .............. G06F 12/0866 710/33 |
| 2007/0230817 A1 | | 10/2007 | Kokojima | |
| 2013/0051455 A1 | * | 2/2013 | Sze | ........................ H04N 19/70 375/240.02 |

(Continued)

FOREIGN PATENT DOCUMENTS

CN 101087425 A 12/2007

OTHER PUBLICATIONS

Semih Esenlik, et al., Line Memory Reduction for ALF Decoding, Joint Collaborative Team on Video Coding (JCT-VC) of ITU-T SG16 WP3 and ISO/IEC JTC1/SC29/WG11, Mar. 16-23, 2011, pp. 1-10, 5th Meeting: Geneva, CH.

(Continued)

*Primary Examiner* — Christopher Findley
(74) *Attorney, Agent, or Firm* — Paratus Law Group, PLLC

(57) ABSTRACT

An image processing apparatus includes a decoding unit, a deblocking filter, and a sample adaptive offset processing unit. The decoding unit is configured to perform a decoding process for a coded stream to generate an image. The deblocking filter is configured to store a block, a corresponding block of which on a current edge is not input, in a memory, out of blocks of the image generated by the decoding unit and read the block stored in the memory at timing when the corresponding block is input, to perform a filter process. The sample adaptive offset processing unit is configured to perform a sample adaptive offset process by using a pixel of the block that has been subjected to the filter process by the deblocking filter.

14 Claims, 23 Drawing Sheets

(56) References Cited

U.S. PATENT DOCUMENTS

| | | | |
|---|---|---|---|
| 2013/0094568 A1* | 4/2013 | Hsu | H04N 19/82 375/240.02 |
| 2013/0182764 A1* | 7/2013 | Narroschke | H04N 19/82 375/240.12 |
| 2014/0037017 A1* | 2/2014 | Lin | H04N 19/423 375/240.29 |
| 2014/0169447 A1* | 6/2014 | Hellman | H04N 19/86 375/240.02 |

OTHER PUBLICATIONS

Dec. 4, 2017, Chinese Office Action Issued for related CN application No. 201410136035.8.

Fu, et al., Sample Adaptive Offset for HEVC, IEEE $13^{th}$ International Workshop on Multimedia Signal Processing (MMSP), Oct. 17-19, 2011, Hangzhou, China.

* cited by examiner

FIG.13

IMAGE PROCESSING APPARATUS AND IMAGE PROCESSING METHOD

CROSS REFERENCE TO RELATED APPLICATIONS

This application claims the benefit of Japanese Priority Patent Application JP 2013-083453 filed Apr. 12, 2013, the entire contents of which are incorporated herein by reference.

BACKGROUND

The present disclosure relates to an image processing apparatus and an image processing method, and more particularly to an image processing apparatus and an image processing method capable of reducing the number of accesses to an external memory which is necessary for an encoding or decoding process.

These days, an apparatus is becoming widespread which handles image information as digital information and, at this time, performs compression coding for an image by adopting a coding system for compression by an orthogonal transform such as a discrete cosine transform and a motion compensation with a use of redundancy unique to image information for the purpose of transmitting and accumulating the information highly efficiently. Examples of the coding system include an MPEG (moving picture experts group), H.264, MPEG-4 Part 10 (advanced video coding, hereinafter, referred to as H.264/AVC), and the like.

Currently, to further improve the coding efficiency as compared to H.264/AVC, JCTVC (joint collaboration team-video coding), which is a joint standardization organization of ITU-T and ISO/IEC, is pursuing standardization of the coding system called HEVC (high efficiency video coding).

In the draft of the HEVC at this point, as an in-loop filter, a deblocking filter and a sample adaptive offset (SAO) filter are adopted. The deblocking filter is an image quality improvement tool for removing a block noise caused by image compressing. The deblocking filter is used not only in the HEVC but also in the H.264/AVC, but there is a difference in the order of filter processes.

In the H.264/AVC, the filter process is performed for a corresponding vertical edge and a corresponding horizontal edge on a macro block basis in this order. On the other hand, in the HEVC, filtering is performed for a corresponding entire vertical edge on a picture basis, and then, filtering is performed for a corresponding entire horizontal edge.

For this reason, the process is not compatible with a process on a coding unit (hereinafter, referred to as CU) basis and on a coding tree unit (hereinafter, referred to as CTU) basis.

In reference software HM of the HEVC, a function is called so that that local decoding for one picture prior to a deblocking filter process is completed, then the filtering is performed for the vertical edge with respect to an entire picture, and then a function is called so that the filtering is performed for the horizontal edge of the entire picture.

It should be noted that in the in-loop filter, the process is performed in order of the deblocking filter and the sample adaptive offset filter. However, in the case where a process is performed on an LCU basis, which is the largest coding unit, on the horizontal edge of the LCU (hereinafter, also simply referred to as LCU edge), a line memory has to be provided for each. In total, a great number of line memories are necessary.

In view of the above, to reduce the great number of line memories, various proposals have been given. For example, "Line Memory Reduction for ALF Decoding" (Semih Esenlik, Matthias Narroschke, Thomas Wedi, JCTVC-E225, March 2011) (hereinafter, referred to as Non-patent Document 1) proposes that, for a process (tap reference pixel) of a sample adaptive offset filtering for a line held for the deblocking, a reconstruction pixel (that is, pixel prior to deblocking) is used.

SUMMARY

The method proposed in Non-patent Document 1 is a process specialized in the LCU-based process.

In contrast, in the case where hardware implementation is carried out in the same architecture as the HM implementation, an image processing apparatus is constituted of an external memory, a bus and external controller for connecting the external memory with an internal bus, an image processing pipeline before the deblocking filter process, which is connected to the bus and external controller, a deblocking filter processing unit for the vertical edge, a deblocking filter processing unit for the horizontal edge, and a sample adaptive offset filter processing unit.

However, with such a structure, a read access and a write access with respect to the external memory frequently occur for each filter process.

In view of the circumstances as described above, it is desirable to reduce the number of accesses to the external memory necessary for the coring or decoding process.

According to a first embodiment of the present disclosure, there is provided an image processing apparatus including a decoding unit, a deblocking filter, and a sample adaptive offset processing unit. The decoding unit is configured to perform a decoding process for a coded stream to generate an image. The deblocking filter is configured to store a block, a corresponding block of which on a current edge is not input, in a memory, out of blocks of the image generated by the decoding unit and read the block stored in the memory at timing when the corresponding block is input, to perform a filter process. The sample adaptive offset processing unit is configured to perform a sample adaptive offset process by using a pixel of the block that has been subjected to the filter process by the deblocking filter.

The deblocking filter may store, in the memory, a block disposed on a left side of a current vertical edge, out of the blocks of the image generated by the decoding unit, and read the block stored in the memory at timing when a block disposed on a right side of the vertical edge is input, to perform the filter process.

The deblocking filter may store, in the memory, a block disposed on an upper side of a current horizontal edge, out of the blocks of the image generated by the decoding unit, and read the block stored in the memory at timing when a block disposed on a lower side of the horizontal edge is input, to perform the filter process.

The deblocking filter may store the block, the corresponding block of which on the current edge is not input, in the memory, out of the blocks of the image generated by the decoding unit, and output a pixel on at least an uppermost line of the block to the sample adaptive offset processing unit.

An image processing method according to the first embodiment of the present disclosure includes performing a decoding process for a coded stream to generate an image, by an image processing apparatus, storing a block, a corresponding block of which on a current edge is not input, in a memory, out of blocks of the image generated and reading the block stored in the memory at timing when the corresponding block is input, to perform a filter process, by the image processing apparatus, and performing a sample adaptive offset process by using a pixel of the block that has been subjected to the filter process, by the image processing apparatus.

According to a second embodiment of the present disclosure, there is provided an image processing apparatus including a deblocking filter, a sample adaptive offset processing unit, and a coding unit. The deblocking filter is configured to store a block, a corresponding block of which on a current edge is not input, in a memory, out of blocks of an image for which a local decoding process is performed at a time of image coding and read the block stored in the memory at timing when the corresponding block is input, to perform a filter process. The sample adaptive offset processing unit is configured to perform a sample adaptive offset process by using a pixel of the block that has been subjected to the filter process by the deblocking filter. The coding unit is configured to code the image by using the pixel that has been subjected to the sample adaptive offset process by the sample adaptive offset processing unit.

The deblocking filter may store, in the memory, a block disposed on a left side of a current vertical edge, out of the blocks of the image for which the local decoding process is performed at the time of image coding, and read the block stored in the memory at timing when a block disposed on a right side of the vertical edge is input, to perform the filter process.

The deblocking filter may store, in the memory, a block disposed on an upper side of a current horizontal edge, out of the blocks of the image for which the local decoding process is performed at the time of image coding, and read the block stored in the memory at timing when a block disposed on a lower side of the horizontal edge is input, to perform the filter process.

the deblocking filter may store the block, the corresponding block of which on the current edge is not input, in the memory, out of the blocks of the image for which the local decoding process is performed at the time of image coding, and output a pixel on at least an uppermost line of the block to the sample adaptive offset processing unit.

An image processing method according to the second embodiment of the present disclosure includes storing a block, a corresponding block of which on a current edge is not input, in a memory, out of blocks of an image for which a local decoding process is performed at a time of image coding and reading the block stored in the memory at timing when the corresponding block is input, to perform a filter process, by an image processing apparatus, performing a sample adaptive offset process by using a pixel of the block that has been subjected to the filter process, by the image processing apparatus, and coding the image by using the pixel that has been subjected to the sample adaptive offset process, by the image processing apparatus.

In the first embodiment of the present disclosure, the image is generated by performing the decoding process for the coded stream, the block, the corresponding block of which on the current edge is not input, out of the block of the image generated, is stored in the memory, and the block stored in the memory is read at the timing when the corresponding block is input, to perform the filter process. Then, the pixel of the block that has been subjected to the filter process is used, thereby performing the sample adaptive offset process.

In the second embodiment of the present disclosure, the block, the corresponding block of which on the current edge is not input, out of the blocks of the image that has been subjected to the local decoding process at the time of the image coding, is stored in the memory, and the block stored in the memory is read at the timing when the corresponding block is input, to perform the filter process. Then, the pixel of the block that has been subjected to the filter process is used, thereby coding the image.

It should be noted that the image processing apparatus described above may be an independent apparatus or an internal block that forms an image coding apparatus or an image decoding apparatus.

According to the first embodiment of the present disclosure, it is possible to decode an image. In particular, it is possible to reduce the access count to the external memory necessary for the decoding process.

According to the second embodiment of the present disclosure, it is possible to code an image. In particular, it is possible to reduce the access count to the external memory necessary for the coding process.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 13 is a diagram showing an order of reading data in the vertical and horizontal intermediate memory in the case of the right-end MB of the picture;

DETAILED DESCRIPTION OF EMBODIMENTS

Hereinafter, embodiments of the present disclosure will be described. It should be noted that the description will be given in the following order.
1. Outline of apparatus and operation
2. Description on method in related art
3. First embodiment
4. Second embodiment
5. Application examples 1. Outline of Apparatus and Operation Structural Example of Image Coding Apparatus FIG. 1 is a diagram showing an example of the structure of an image coding apparatus as an image processing apparatus to which the present disclosure is applied.

Figure 1:
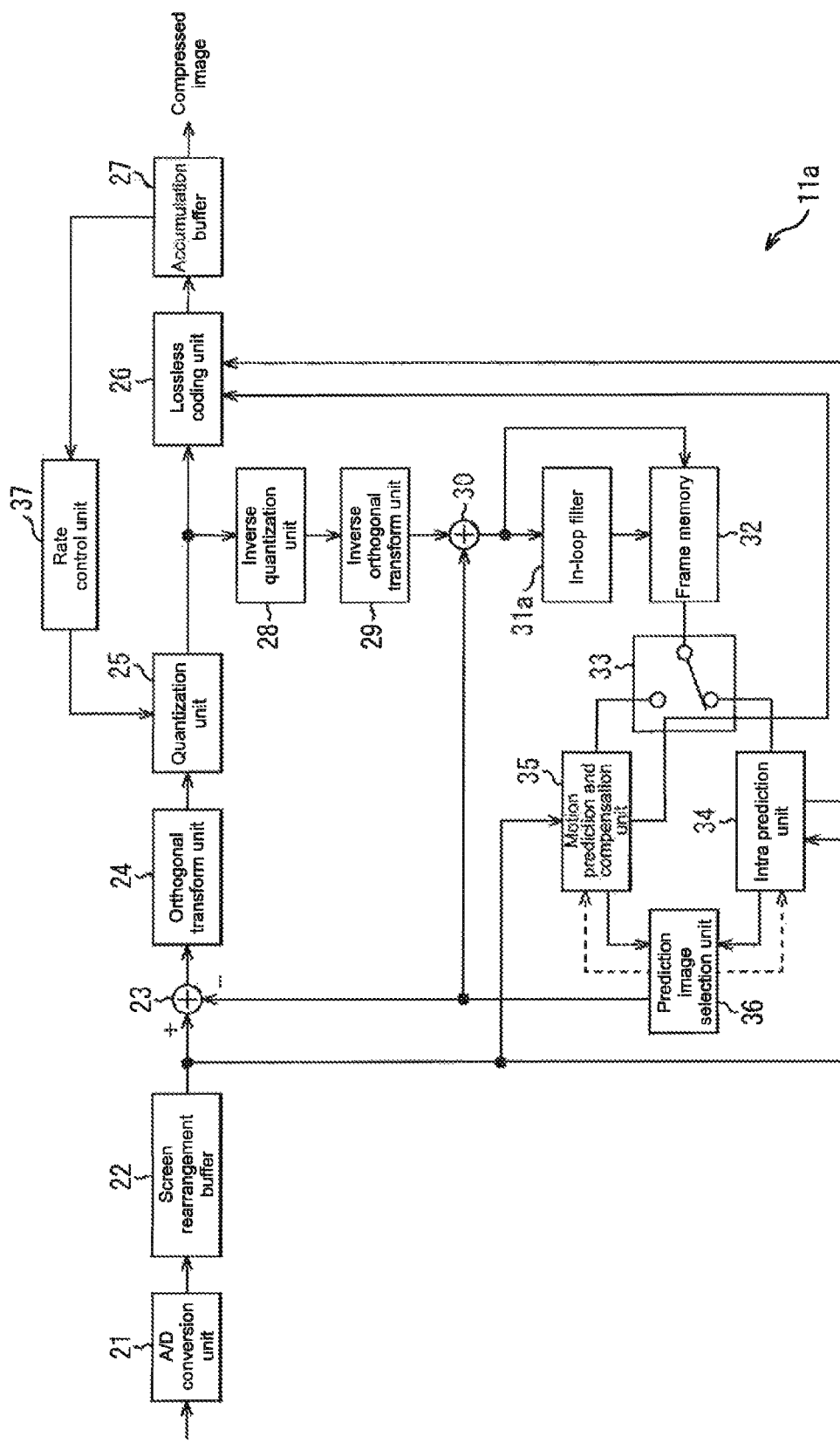
FIG. 1 is a block diagram showing a main structural example of an image coding apparatus.

An image coding apparatus 1a shown in FIG. 1 codes image data by using a prediction process. As a coding system, for example, an HEVC (high efficiency video coding) system or the like is used.

In the example of FIG. 1, the image coding apparatus 1a includes an A/D (analog/digital) conversion unit 21, a screen rearrangement buffer 22, a computation unit 23, an orthogonal transform unit 24, a quantization unit 25, a lossless coding unit 26, and an accumulation buffer 27. The image coding apparatus 11a further includes an inverse quantization unit 28, an inverse orthogonal transform unit 29, a computation unit 30, an in-loop filter 31a, a frame memory 32, a selection unit 33, an intra prediction unit 34, a motion prediction and compensation unit 35, a prediction image selection unit 36, and a rate control unit 37.

The A/D conversion unit 21 performs A/D conversion for input image data and outputs the data to the screen rearrangement buffer 22 to store the data therein.

The screen rearrangement buffer 22 rearranges frames of the image stored in order of display to be in order for coding in accordance with a GOP (group of picture) structure. The screen rearrangement buffer 22 supplies the image in which the frames are rearranged to the computation unit 23. Further, the screen rearrangement buffer 22 also supplies the image in which the frames are rearranged to the intra prediction unit 34 and the motion prediction and compensation unit 35.

The computation unit 23 subtracts a prediction image, which is supplied from the intra prediction unit 34 or the motion prediction and compensation unit 35 via the prediction image selection unit 36, from the image read from the screen rearrangement buffer 22, and outputs difference information thus obtained to the orthogonal transform unit 24.

For example, in the case of an image for which intra coding is performed, the computation unit 23 subtracts the prediction image supplied from the intra prediction unit 34 from the image read from the screen rearrangement buffer 22. In addition, for example, in the case of an image for which inter coding is performed, the computation unit 23 subtracts the prediction image supplied from the motion prediction and compensation unit 35 from the image read from the screen rearrangement buffer 22.

The orthogonal transform unit 24 performs, for the difference information supplied from the computation unit 23, the orthogonal transform such as a discrete cosine transform and a Karhunen-Loeve transform, and supplies a transform coefficient thus obtained to the quantization unit 25.

The quantization unit 25 quantizes the transform coefficient output from the orthogonal transform unit 24. The quantization unit 25 supplies the quantized transform coefficient to the lossless coding unit 26.

The lossless coding unit 26 performs lossless coding such as variable-length coding and arithmetic coding for the quantized transform coefficient.

The lossless coding unit 26 obtains a parameter such as information that indicates an intra prediction mode from the intra prediction unit 34 and obtains parameters such as information that indicates an inter prediction mode and motion vector information from the motion prediction and compensation unit 35.

The lossless coding unit 26 codes the quantized transform coefficient and codes the parameters thus obtained (syntax element) to be set as a part of header information of the coded data (multiplexing). The lossless coding unit 26 supplies the coded data thus obtained to the accumulation buffer 27 and causes the data to be accumulated therein.

For example, in the lossless coding unit 26, the lossless coding process such as the variable-length coding and the arithmetic coding is performed. As the variable-length coding, CAVLC (context-adaptive variable length coding) can be given, for example. As the arithmetic coding, CABAC (context-adaptive binary arithmetic coding) can be given, for example.

The accumulation buffer 27 temporarily stores the coded data supplied from the lossless coding unit 26 and, at predetermined timing, outputs to a recording apparatus (not shown), a transmission line (not shown), or the like at a later stage as a coded image.

Further, the transform coefficient quantized in the quantization unit 25 is also supplied to the inverse quantization unit 28. The inverse quantization unit 28 performs inverse quantization for the quantized transform coefficient in such a manner as to correspond with the quantization by the quantization unit 25. The inverse quantization unit 28 supplies the transform coefficient thus obtained to the inverse orthogonal transform unit 29.

The inverse orthogonal transform unit 29 performs inverse orthogonal transform for the supplied transform coefficient in such a manner as to correspond with the orthogonal transform process by the orthogonal transform unit 24. An output (difference information restored) that has been subjected to the inverse orthogonal transform is supplied to the computation unit 30.

The computation unit 30 adds a prediction image supplied from the intra prediction unit 34 or the motion prediction and compensation unit 35 via the prediction image selection unit 36 to an inverse orthogonal transform result, that is, the restored difference information supplied from the inverse orthogonal transform unit 29, thereby obtaining an image locally decoded (decoded image).

For example, when the difference information corresponds to an image for which intra coding is to be performed, the computation unit 30 adds the prediction image supplied from the intra prediction unit 34 to the difference information. For example, when the difference information corresponds to an image for which inter coding is to be performed, the computation unit 30 adds the prediction image supplied from the motion prediction and compensation unit 35 to the difference information.

The decoded image as a result of the addition is supplied to the in-loop filter 31a and the frame memory 32.

The in-loop filter 31a includes the deblocking filter and the sample adaptive offset (SAO) filter. The in-loop filter 31a performs the deblocking filter process and the sample adaptive offset filter process for pixels (that is, reconstruction pixels) of the decoded image and supplies an image obtained by adding a result of the filter processes to the frame memory 32.

It should be noted that in the in-loop filter 31a, vertical and horizontal processes of the deblocking filter and the sample adaptive offset filter process are performed in a pipeline manner. The structure of the in-loop filter 31a will be described in detail with reference to FIG. 7.

The frame memory 32 outputs accumulated reference images to the intra prediction unit 34 or the motion prediction and compensation unit 35 through the selection unit 33 at predetermined timing.

For example, in the case of an image for which the intra coding is to be performed, the frame memory 32 supplies the reference images to the intra prediction unit 34 through the selection unit 33. For example, in the case where the inter coding is to be performed, the frame memory 32 supplies the reference images to the motion prediction and compensation unit 35 through the selection unit 33.

In the case where the reference images supplied from the frame memory 32 are images to be subjected to the intra coding, the selection unit 33 supplies the reference images to the intra prediction unit 34. Further, in the case where the reference images supplied from the frame memory 32 are images to be subjected to the inter coding, the selection unit 33 supplies the reference images to the motion prediction and compensation unit 35.

The intra prediction unit 34 performs intra prediction (in-screen prediction) for generating a prediction image by using pixel values in a screen. The intra prediction unit 34 performs the intra prediction in a plurality of modes (intra prediction modes).

The intra prediction unit 34 generates prediction images in the entire intra prediction modes, evaluates the prediction images, and selects an optimal mode. Upon selection of the optimal intra prediction mode, the intra prediction unit 34 supplies the prediction image generated in the optimal mode to the computation unit 23 and the computation unit 30 through the prediction image selection unit 36.

Further, as described above, the intra prediction unit 34 supplies parameters such as intra prediction mode information that indicates the adopted intra prediction mode to the lossless coding unit 26 as necessary.

The motion prediction and compensation unit 35 performs, for the image to be subjected to the inter coding, motion prediction by using an input image supplied from the screen rearrangement buffer 22 and the reference image supplied from the frame memory 32 through the selection unit 33. The motion prediction and compensation unit 35 performs a motion compensation process in accordance with a motion vector detected by the motion prediction and generates a prediction image (inter prediction image information).

The motion prediction and compensation unit 35 performs the inter prediction process in entire inter prediction modes as candidates to generate the prediction image. The motion prediction and compensation unit 35 supplies a generated prediction image to the computation unit 23 and the computation unit 30 through the prediction image selection unit 36.

In addition, the motion prediction and compensation unit 35 supplies parameters such as inter prediction mode information that indicates the adopted inter prediction mode and motion vector information that indicates the calculated motion vector to the lossless coding unit 26.

In the case of the image to be subjected to the intra coding, the prediction image selection unit 36 supplies the output of the intra prediction unit 34 to the computation unit 23 and the computation unit 30, and in the case of the image to be subjected to the inter coding, supplies the output of the motion prediction and compensation unit 35 to the computation unit 23 and the computation unit 30.

On the basis of compression images accumulated in the accumulation buffer 27, the rate control unit 37 controls the rate of the quantization operation by the quantization unit 25 so as not to cause overflow or underflow.

(Operation of Image Coding Apparatus)

Figure 2:
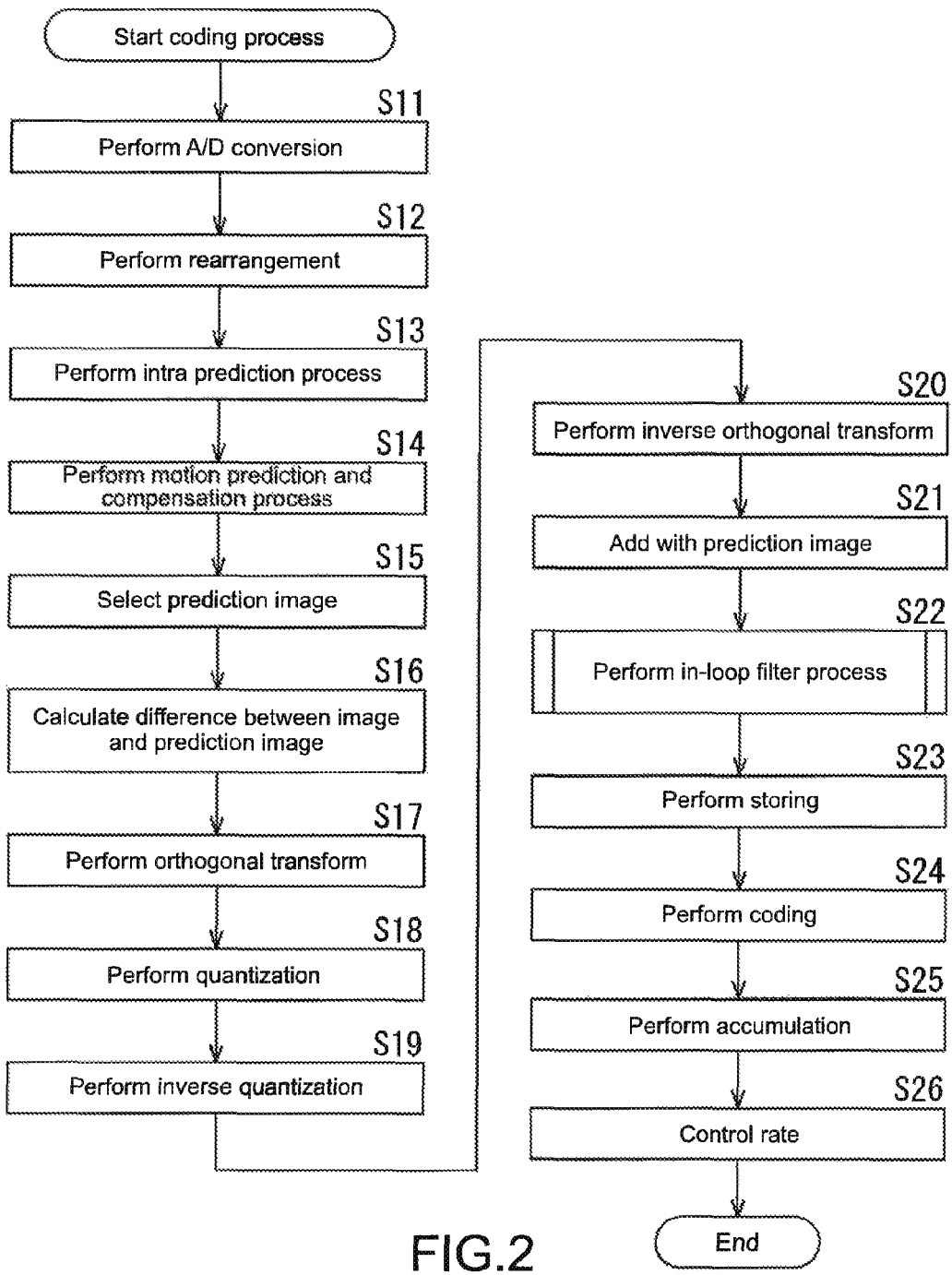
FIG. 2 is a flowchart for explaining an example of a coding process.

With reference to FIG. 2, a description will be given on a flow of the coding process performed by the image coding apparatus 11a as described above.

In Step S11, the A/D conversion unit 21 performs A/D conversion for an image input thereto. In Step S12, the screen rearrangement buffer 22 stores the image for which the A/D conversion has been performed and performs rearrangement from the order of displaying pictures into the order of coding.

In the case where the image as a process target supplied from the screen rearrangement buffer 22 is an image of a block to be subjected to the intra process, an image which has been decoded and is to be referred to is read from the frame memory 32 and supplied to the intra prediction unit 34 through the selection unit 33.

On the basis of those images, in Step S13, the intra prediction unit 34 intra-predicts pixels of the block as the process target in all the intra prediction modes as the candidates. It should be noted that, as the decoded pixels to be referred to, pixels that are not filtered by the in-loop filter 31 are used.

Through the process, the intra prediction is performed in all the intra prediction modes as the candidates, and a cost function value is calculated with respect to all the intra prediction modes as the candidates. Then, on the basis of the cost function value calculated, an optimal intra prediction mode is selected, and a prediction image generated by the intra prediction in the optimal intra prediction mode and the cost function value thereof are supplied to the prediction image selection unit 36.

In the case where the image as the process target supplied from the screen rearrangement buffer 22 is the image for which the inter process is to be performed, the image to be referred to is read from the frame memory 32 and supplied to the motion prediction and compensation unit 35 through the selection unit 33. On the basis of those images, the motion prediction and compensation unit 35 performs the motion prediction and compensation process in Step S14.

Through the process, the motion prediction process is performed in all the inter prediction modes as the candidates, and a cost function value is calculated with respect to all the inter prediction modes as the candidates. On the basis of the cost function value calculated, an optimal inter prediction mode is determined. Then, the prediction image generated by the optimal inter prediction mode and the cost function value thereof are supplied to the prediction image selection unit 36.

In Step S15, on the basis of the cost function values output from the intra prediction unit 34 and the motion prediction and compensation unit 35, the prediction image selection unit 36 determines either one of the optimal intra prediction mode and the optimal inter prediction mode as an optimal prediction mode. Then, the prediction image selection unit 36 selects a prediction image of the optimal prediction mode determined and supplies the prediction image selected to the computation units 23 and 30. The prediction image is used for the computation in Steps S16 and S21 to be described later.

It should be noted that selection information of the prediction image is supplied to the intra prediction unit 34 or the motion prediction and compensation unit 35. In the case where the prediction image of the optimal intra prediction mode is selected, the intra prediction unit 34 supplies information (that is, parameter relating to the intra prediction) that indicates the optimal intra prediction mode to the lossless coding unit 26.

In the case where the prediction image of the optimal inter prediction mode is selected, the motion prediction and compensation unit 35 outputs information that indicates the optimal inter prediction mode and information (that is, parameter relating to the motion prediction) corresponding to the optimal inter prediction mode to the lossless coding unit 26. As the information corresponding to the optimal inter prediction mode, motion vector information, reference frame information, or the like is given.

In Step S16, the computation unit 23 calculates a difference between the image rearranged in Step S12 and the prediction image selected in Step S15. The prediction image is supplied to the computation unit 23 through the prediction image selection unit 36 from the motion prediction and compensation unit 35 in the case of performing the inter prediction or from the intra prediction unit 34 in the case of performing the intra prediction.

The differential data has a smaller data volume as compared to the original image data. Therefore, it is possible to compress the data volume as compared to the case where the image is coded as it is.

In Step S17, the orthogonal transform unit 24 performs the orthogonal transform for the differential information supplied from the computation unit 23. Specifically, the orthogonal transform such as the discrete cosine transform and the Karhunen-Loeve transform is performed to output the transform coefficient.

In Step S18, the quantization unit 25 quantizes the transform coefficient. At the time of the quantization, the rate is controlled as will be described in Step S26.

The differential information quantized as described above is locally decoded as follows. Specifically, in Step S19, the inverse quantization unit 28 performs the inverse quantization for the transform coefficient quantized by the quantization unit 25 with a characteristic corresponding to that of the quantization unit 25. In Step S20, the inverse orthogonal transform unit 29 performs the inverse orthogonal transform for the transform coefficient that has been subjected to the inverse quantization by the inverse quantization unit 28 with a characteristic corresponding to that of the orthogonal transform unit 24.

In Step S21, the computation unit 30 adds the prediction image input through the prediction image selection unit 36 to the differential information locally decoded, thereby generating an image (image corresponding to the input to the computation unit 23) locally decoded.

In Step S22, the in-loop filter 31*a* performs the filter process composed of the deblocking filter and the sample adaptive offset filter, with respect to the image output from the computation unit 30. At this time, the vertical and horizontal processes of the deblocking filter and the sample adaptive offset filter process are performed in a pipeline manner. The in-loop filter process will be described later in detail with reference to FIG. 16. The decoded image from the in-loop filter 31*a* is output to the frame memory 32.

In Step S23, the frame memory 32 stores the image that has been subjected to the filtering. It should be noted that an image that is not filtered by the in-loop filter 31*a* is also supplied to the frame memory 32 from the computation unit 30 and stored therein.

On the other hand, the transform coefficient quantized in Step S18 is also supplied to the lossless coding unit 26. In Step S24, the lossless coding unit 26 codes the quantized transform coefficient output from the quantization unit 25 and the parameters supplied. That is, the differential image is subjected to the lossless coding such as the variable length coding and the arithmetic coding and is thus compressed.

In Step S25, the accumulation buffer 27 accumulates the coded differential image (that is, coded stream) as a compressed image. The compressed image accumulated in the accumulation buffer 27 is read when necessary and transmitted to the decoding side through the transmission line.

In Step S26, on the basis of the compressed image accumulated in the accumulation buffer 27, the rate control unit 37 controls the rate of the quantization operation by the quantization unit 25 so as not to cause the overflow or the underflow.

When the process of Step S26 is completed, the coding process is completed.

(Structural Example of Image Decoding Apparatus)

Figure 3:
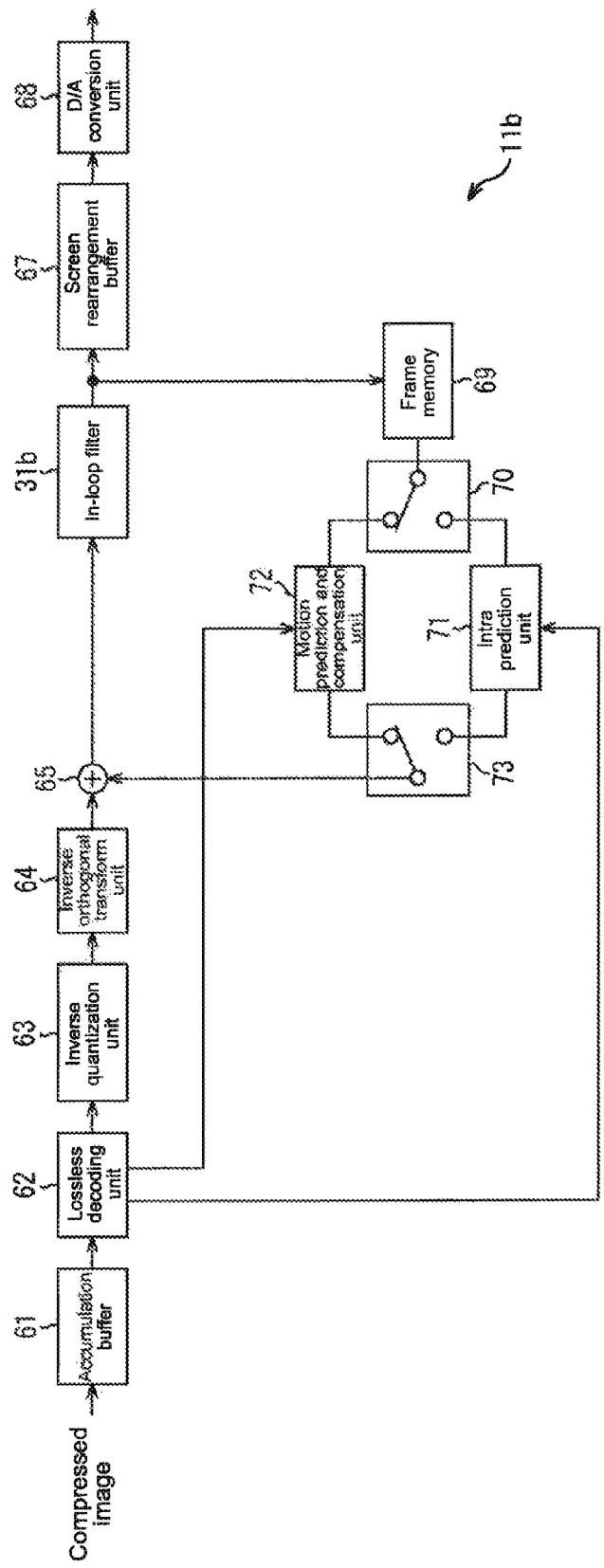
FIG. 3 is a block diagram showing a main structural example of an image decoding apparatus.

FIG. 3 is a diagram showing an example of the structure of an image decoding apparatus as the image processing apparatus to which the present disclosure is applied. An image decoding apparatus 11*b* shown in FIG. 3 is a decoding apparatus corresponding to the image coding apparatus 11*a* shown in FIG. 1.

The coded data coded by the image coding apparatus 11*a* is transmitted to the image decoding apparatus 11*b* corresponding to the image coding apparatus 11*a* through a predetermined transmission line and is decoded.

As shown in FIG. 3, the image decoding apparatus 11*b* includes an accumulation buffer 61, a lossless decoding unit 62, an inverse quantization unit 63, an inverse orthogonal transform unit 64, a computation unit 65, an in-loop filter 31*b*, a screen rearrangement buffer 67, and a D/A conversion unit 68. Further, the image decoding apparatus 11*b* includes a frame memory 69, a selection unit 70, an intra prediction unit 71, a motion prediction and compensation unit 72, and a selection unit 73.

The accumulation buffer 61 accumulates coded data transmitted thereto. The coded data is coded by the image coding apparatus 11*a*. The lossless decoding unit 62 decodes the coded data read from the accumulation buffer 61 at predetermined timing in such a system as to correspond to the coding system of the lossless coding unit 26 shown in FIG. 1.

The lossless decoding unit 62 supplies parameters such as information that indicates the intra prediction mode which is decoded to the intra prediction unit 71 and supplies parameters such as the information that indicates the inter prediction mode and the motion vector information to the motion prediction and compensation unit 72.

The inverse quantization unit 63 performs the inverse quantization for coefficient data (quantization coefficient) obtained by being decoded by the lossless decoding unit 62 in such a system as to correspond to the quantization system of the quantization unit 25 shown in FIG. 1. In other words, the inverse quantization unit 63 uses a quantization parameter supplied from the image coding apparatus 11a to perform the inverse quantization for the quantization coefficient in the same manner as the inverse quantization unit 28 shown in FIG. 1.

The inverse quantization unit 63 supplies coefficient data that has been subjected to the inverse quantization, that is, an orthogonal transform coefficient to the inverse orthogonal transform unit 64. The inverse orthogonal transform unit 64 performs the inverse orthogonal transform for the orthogonal transform coefficient in such a manner as to correspond to the orthogonal transform by the orthogonal transform unit 24 shown in FIG. 1, thereby obtaining decoded residual data corresponding residual data prior to the orthogonal transform in the image coding apparatus 11a.

The decoded residual data obtained by the inverse orthogonal transform is supplied to the computation unit 65. Further, to the computation unit 65, the prediction image is supplied from the intra prediction unit 71 or the motion prediction and compensation unit 72 through the selection unit 73.

The computation unit 65 adds the decoded residual data and the prediction image, thereby obtaining decoded image data corresponding to the image data prior to the subtraction of the prediction image by the computation unit 23 of the image coding apparatus 11a. The computation unit 65 supplies the decoded image data to the in-loop filter 31b.

The in-loop filter 31b includes the deblocking filter and the sample adaptive offset filter like the in-loop filter 31a of the image coding apparatus 11a. The in-loop filter 31b performs a deblocking filter process and a sample adaptive offset filter process with respect to pixels (that is, reconstruction pixels) of the decoded image and supplies an image to which results of the filter processes are added to the screen rearrangement buffer 67.

It should be noted that in the in-loop filter 31b, vertical and horizontal processes of the deblocking filter and the sample adaptive offset filter process are performed in a pipeline manner. The structure of the in-loop filter 31b will be described later in detail with reference to FIG. 7.

The screen rearrangement buffer 67 performs image rearrangement. That is, the order of frames rearranged for the coding by the screen rearrangement buffer 22 shown in FIG. 1 is rearranged in the original order for the display. The D/A conversion unit 68 performs the D/A conversion for the image supplied from the screen rearrangement buffer 67, and the image is output on a display (not shown) and displayed thereon.

The output of the in-loop filter 31b is further supplied to the frame memory 69.

The frame memory 69, the selection unit 70, the intra prediction unit 71, the motion prediction and compensation unit 72, and the selection unit 73 are corresponds to the frame memory 32, the selection unit 33, the intra prediction unit 34, the motion prediction and compensation unit 35, and the prediction image selection unit 36, respectively.

The selection unit 70 reads the image to be subjected to the inter process and the image to be referred to from the frame memory 69 and supplies the images to the motion prediction and compensation unit 72. Further, the selection unit 70 reads the image to be used to the intra prediction from the frame memory 69 and supplies the image to the intra prediction unit 71.

To the intra prediction unit 71, information and the like that indicate the intra prediction mode obtained by decoding header information are supplied from the lossless decoding unit 62 as necessary. On the basis of the information, the intra prediction unit 71 generates the prediction image from the reference image obtained from the frame memory 69 and supplies the generated prediction image to the selection unit 73.

To the motion prediction and compensation unit 72, information (prediction mode information, motion vector information, reference frame information, a flag, various parameters, and the like) obtained by decoding the header information is supplied from the lossless decoding unit 62.

On the basis of those information items supplied from the lossless decoding unit 62, the motion prediction and compensation unit 72 generates the prediction image from the reference image obtained from the frame memory 69 and supplies the generated prediction image to the selection unit 73.

The selection unit 73 selects the prediction image generated by the motion prediction and compensation unit 72 or the intra prediction unit 71 and supplies the prediction image selected to the computation unit 65.

(Operation of Image Decoding Apparatus)

Figure 4:
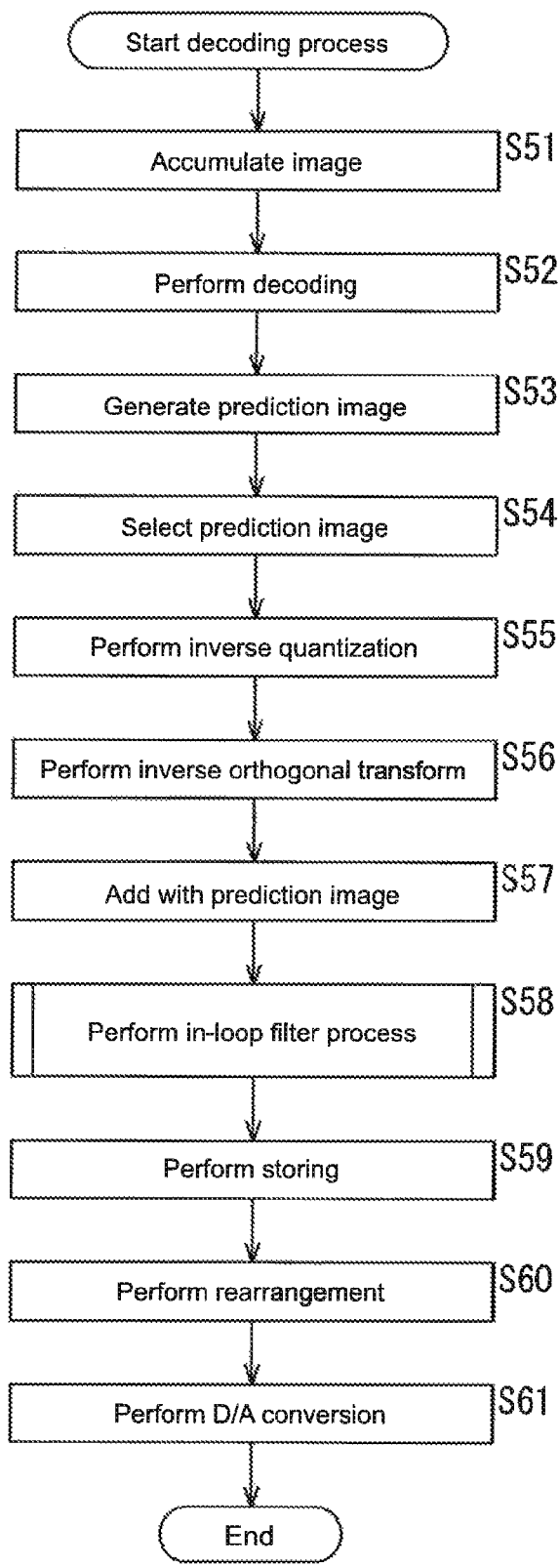
FIG. 4 is a flowchart for explaining an example of the flow of a decoding process.

With reference to FIG. 4, a description will be given on an example of a flow of the decoding process performed by the image decoding apparatus 11b as described above.

When the decoding process is started, in Step S51, the accumulation buffer 61 accumulates the coded data transmitted. In Step S52, the lossless decoding unit 62 decodes the coded data supplied from the accumulation buffer 61. An I picture, a P picture, and a B picture coded by the lossless coding unit 26 shown in FIG. 1 are decoded.

Prior to the decoding of the pictures, the parameters such as the motion vector information, the reference frame information, and the prediction mode information (intra prediction mode or inter prediction mode) are also decoded.

In the case where the prediction mode information is the intra prediction mode information, the prediction mode information is supplied to the intra prediction unit 71. In the case where the prediction mode information is the inter prediction mode information, the motion vector information and the like corresponding to the prediction mode information are supplied to the motion prediction and compensation unit 72.

In Step S53, the intra prediction unit 71 or the motion prediction and compensation unit 72 performs a prediction image generation process in accordance with the prediction mode information supplied from the lossless decoding unit 62.

That is, in the case where the intra prediction mode information is supplied from the lossless decoding unit 62, the intra prediction unit 71 generates a most probable mode and generates the intra prediction image in the intra prediction mode by parallel processing. In the case where the inter prediction mode information is supplied from the lossless decoding unit 62, the motion prediction and compensation unit 72 performs the motion prediction and compensation process in the inter prediction mode to generate the inter prediction image.

Through the process, the prediction image (intra prediction image) generated by the intra prediction unit 71 or the prediction image (inter prediction image) generated by the motion prediction and compensation unit 72 is supplied to the selection unit 73.

In Step S54, the selection unit 73 selects the prediction image. That is, the prediction image generated by the intra prediction unit 71 or the prediction image generated by the motion prediction and compensation unit 72 is supplied. Therefore, the supplied prediction image is selected and supplied to the computation unit 65, and then the prediction image is added with an output of the inverse orthogonal transform unit 64 in Step S57 to be described later.

In Step S52 described above, the transform coefficient decoded by the lossless decoding unit 62 is also supplied to the inverse quantization unit 63. In Step S55, the inverse quantization unit 63 performs the inverse quantization for the transform coefficient decoded by the lossless decoding unit 62 with a characteristic corresponding to that of the quantization unit 25 shown in FIG. 1.

In Step S56, the inverse orthogonal transform unit 64 performs inverse orthogonal transform for the transform coefficient, which has been subjected to the inverse quantization by the inverse quantization unit 63, with a characteristic corresponding to that of the orthogonal transform unit 24 shown in FIG. 1. As a result, the differential information corresponding to the input of the orthogonal transform unit 24 (output of the computation unit 23) shown in FIG. 1 is decoded.

In Step S57, the computation unit 65 adds the prediction image which is selected in the process of Step S54 and input through the selection unit 73 with the differential information. As a result, the original image is decoded.

In Step S58, the in-loop filter 31b performs the filter process formed of the deblocking filter and the sample adaptive offset filter with respect to the image output from the computation unit 65. At this time, the vertical and horizontal process of the deblocking filter and the sample adaptive offset filter process are performed in a pipeline manner. The in-loop filter process will be described in detail later with reference to FIG. 16. A decoded image from the in-loop filter 31b is output to the frame memory 69 and the screen rearrangement buffer 67.

In Step S59, the frame memory 69 stores the image that has been subjected to the filtering.

In Step S60, the screen rearrangement buffer 67 performs image rearrangement after the in-loop filter 31b. That is, the order of frames rearranged for the coding by the screen rearrangement buffer 22 of the image coding apparatus 11a is rearranged to the original order for the display.

In Step S61, the D/A conversion unit 68 performs the D/A conversion for the image from the screen rearrangement buffer 67. The image is output to a display (not shown) and displayed thereon.

When the process of Step S61 is completed, the decoding process is completed.

<Description on Method in Related Art>

In the HEVC, as the in-loop filter, the deblocking filter and the sample adaptive offset filter are adopted. The deblocking filter is used not only in the HEVC but also in H.264 and MPEG (moving picture experts group) 4 Part 10 (AVC (advanced video coding)) (hereinafter referred to as H.264/AVC). However, there is a difference in order of the filter process therebetween.

In the H.264/AVC, the filter process is performed for a corresponding vertical edge and a corresponding horizontal edge on a macro block basis in this order. On the other hand, in the HEVC, filtering is performed for a corresponding entire vertical edge on a picture basis, and thereafter, filtering is performed for a corresponding entire horizontal edge.

For this reason, the process is not compatible with a process on a coding unit (hereinafter, referred to as CU) basis and on a coding tree unit (hereinafter, referred to as CTU) basis.

Here, an LCU (largest coding unit) and the CU (coding unit) will be described in brief. In the H.264/AVC, one macro block is divided into a plurality of motion compensation blocks, and different pieces of motion information can be given to the blocks. In other words, in the H.264/AVC, a hierarchical structure of the macro block and sub-macro blocks is defined. On the other hand, in the HEVC, the coding unit (CU) is defined.

The CU is an area (partial area of an image on a picture basis) as a process unit for coding (decoding), which functions like the macro block in the H.264/AVC. The latter has a constant size of 16×16 pixels, while the former has a size which is not constant and thus specified in image compression information in respective sequences.

For example, in a sequence parameter set (SPS) contained in the coded data to be output, a largest coding unit (LCU) and a smallest coding unit (SCU) of the CU are defined.

In the LCUs, by setting split-flag=1 within such a range as not to be smaller than the size of the SCU, the division can be performed to obtain the CUs having a smaller size.

In the case where such a coding system that the CU is defined, and various processes are performed on the CU basis, as in the HEVC system as described above, it is possible to consider that the macro block in the H.264/AVC system corresponds to the LCU, and a block (sub block) corresponds to the CU. However, the CU has the hierarchical structure, so the size of the LCU on the uppermost layer is generally set to be larger than the macro block in the H.264/AVC system, for example, to be 64×64 pixels.

Thus, in the following, the assumption is made that the LCU includes the macro block in the H.264/AVC system, and the CU includes the block (sub block) in the H.264/AVC system. That is, the "block" used in the following description indicates any partial area in a picture, and a size, a shape, a characteristic, and the like thereof are not limited. Specifically, the "block" includes any area (process unit) such as the TU, PU, SCU, CU, LCU, sub block, macro block, and slice. Of course, a partial area (process unit) other than the above is also included therein. If it is necessary to limit the size, the process unit, or the like, a description will be given as appropriate.

Further, in this specification, the assumption is made that the CTU (coding tree unit) is a unit including a CTB (coding tree block) of the LCU (largest coding unit) and a parameter at a time of processing on the LCU basis (level). Further, the assumption is made that the CU (coding unit) that forms the CTU is a unit including a parameter at a time of processing on the CU basis (level) thereof.

(Description of Deblocking Filter of HEVC)

Figure 5:
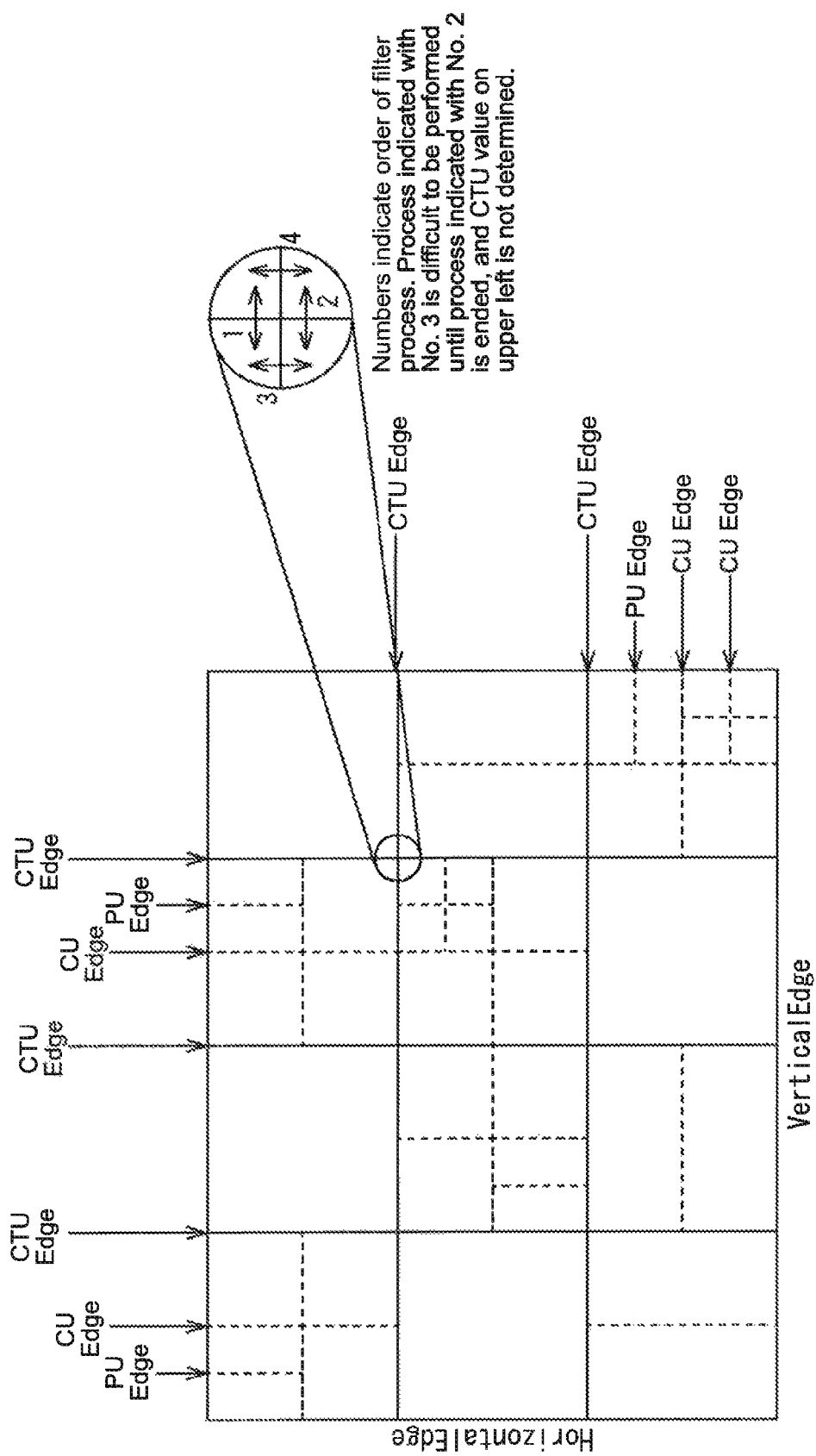
FIG. 5 is a diagram for explaining a deblocking filter of an HEVC.

With reference to FIG. 5, the deblocking filter in the HEVC system will be described. In an example of FIG. 5, a CTU edge, a CU edge, and a PU edge in a picture are indicated.

The deblocking filter of the HEVC performs filtering for a vertical edge of an entire picture and then performs filtering for a horizontal edge.

Numbers indicated in an enlarged part of FIG. 5 shows the order of filter process. A process of number 3 is difficult to be performed until a process of number 2 is terminated, and thus a CTU value on the upper left is not determined. That is, the filtering for the horizontal edge is difficult to be performed until the filtering for the vertical edge with the next CTU or CU is performed. In other words, the horizontal edge filter process and the vertical edge filter process have a dependency relationship of the filter process.

The deblocking filter of the HEVC is not compatible with an image processing pipeline up to a preceding stage of the deblocking filter which operates on the CTU or CU basis, because the process is not closed in the CTU or the CU as described above.

Also in reference software HM of the HEVC, a function is called so that, after local decoding of one picture prior to the deblocking filter process is terminated, the filtering is performed for the vertical edge with respect to the entire picture. After that, a function is called so that the filtering is performed for the horizontal edge of the entire picture.

(Structure of Image Processing System of HEVC)

Figure 6:
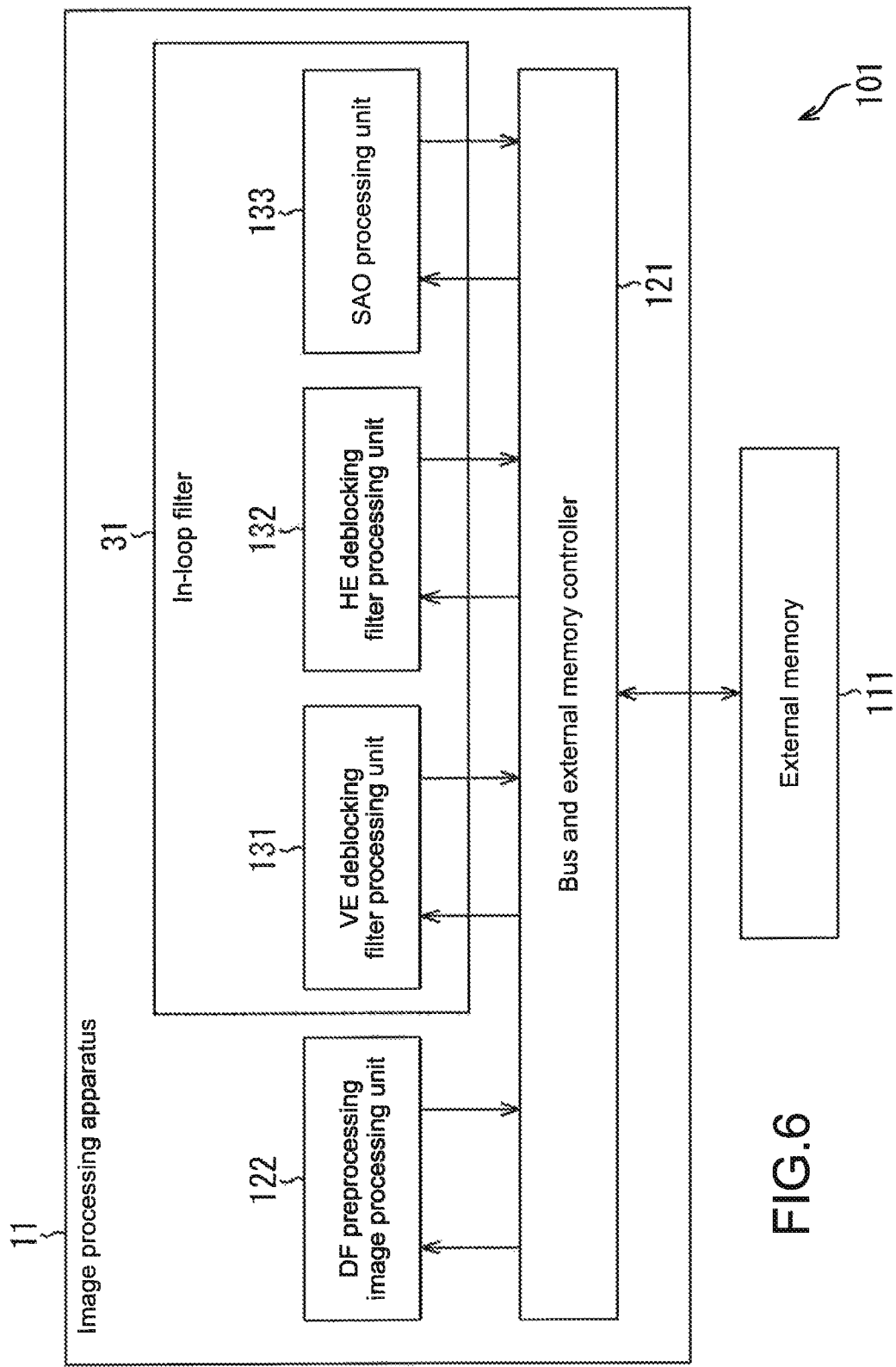
FIG. 6 is a block diagram showing a structural example of an image processing system of the HEVC.

FIG. 6 is a block diagram showing a structural example of an image processing system of the HEVC. In the example of FIG. 6, an image processing system 101 is shown in which hardware implementation is performed with the same architecture as HM implementation.

The image processing system 101 is constituted of an image processing apparatus 11 and an external memory 111 formed of a DRAM (dynamic random access memory) and the like.

The image processing apparatus 11 includes a bus and external memory controller 121, a DF (deblocking filter) preprocessing image processing unit 122, and an in-loop filter 31.

It should be noted that the image processing unit 11 shown in FIG. 6 corresponds to the image coding apparatus 11a shown in FIG. 1 and the image decoding apparatus 11b shown in FIG. 3.

The bus and external memory controller 121 connects an internal bus and the external memory 111. To the bus and external memory controller 121, in addition to the external memory 111, the DF preprocessing image processing unit 122 and units of the in-loop filter 31 are connected in the image processing apparatus 11. It should be noted that, hereinafter, the DF preprocessing image processing unit 122 and the units of the in-loop filter 31 access the external memory 111 through the bus and external memory controller 121 without particular description.

The DF preprocessing image processing unit 122 operates on the CU or CTU basis, to read picture data from the external memory 111, perform image processing before deblocking filter preprocessing, and write the picture data prior to the deblocking filter to the external memory 111 sequentially.

It should be noted that, in the case where the image processing apparatus 11 shown in FIG. 6 corresponds to the image coding apparatus 11a shown in FIG. 1, the DF preprocessing image processing unit 122 corresponds to units excluding the in-loop filter 31a, and the in-loop filter 31 corresponds to the in-loop filter 31a in the image coding apparatus 11a shown in FIG. 1.

In addition, in the case where the image processing apparatus 11 shown in FIG. 6 corresponds to the image decoding apparatus 11b shown in FIG. 3, the DF preprocessing image processing unit 122 corresponds to units excluding the in-loop filter 31b, and the in-loop filter 31 corresponds to the in-loop filter 31b in the image decoding apparatus 11b shown in FIG. 3.

The in-loop filter 31 is constituted of a VE (vertical edge) deblocking filter processing unit 131, an HE (horizontal edge) deblocking filter processing unit 132, and an SAO processing unit 133.

When the DF preprocessing image processing unit 122 writes data of one picture, the VE deblocking filter processing unit 131 starts an operation and performs filtering for the vertical edge while reading the data of the external memory 111. The VE deblocking filter processing unit 131 writes back the data that has been subjected to the filtering to the external memory 111.

The HE deblocking filter processing unit 132 performs filtering for the horizontal edge while reading the data that has been subjected to the filtering by the VE deblocking filter processing unit 131 from the external memory 111. The HE deblocking filter processing unit 132 writes back the data that has been subjected to the filtering to the external memory 111.

Finally, the SAO processing unit 133 performs a sample adaptive offset process while reading the data that has been subjected to the filtering by the HE deblocking filter processing unit 132 from the external memory 111. The SAO processing unit 133 writes back the data that has been subjected to the process to the external memory 111.

It should be noted that in the case where the image processing apparatus 11 corresponds to the image coding apparatus 11a shown in FIG. 1, at a previous stage of the SAO processing unit 133, a filter determination unit or the like that determines a parameter or the like of the SAO is provided, but there is no direct relationship with the present technology, so a description thereof will be omitted.

When all the pixel data is written back to the external memory 111 by the SAO processing unit 133, the local decoding is completed.

However, in such a structure, each time the filter process of the in-loop filter 31 is performed, a read access and a write access with respect to the external memory 111 frequently occur. For example, in the case where a sequence of 4096× 2160 4:2:0 8 bit 60 P is processed in real time, approximately 38 Gbps is necessary as a DRAM band of an entire filter of the in-loop filter 31.

It should be noted that the DRAM band of the entire filter of the in-loop filter 31 refers to a band for the write of the DF preprocessing image processing unit 122 and the read and write of the VE deblocking filter processing unit 131 to the SAO processing unit 133 with respect to the external memory 111 in total.

First Embodiment

Structural Example of Image Processing System According to Present Technology

Figure 7:
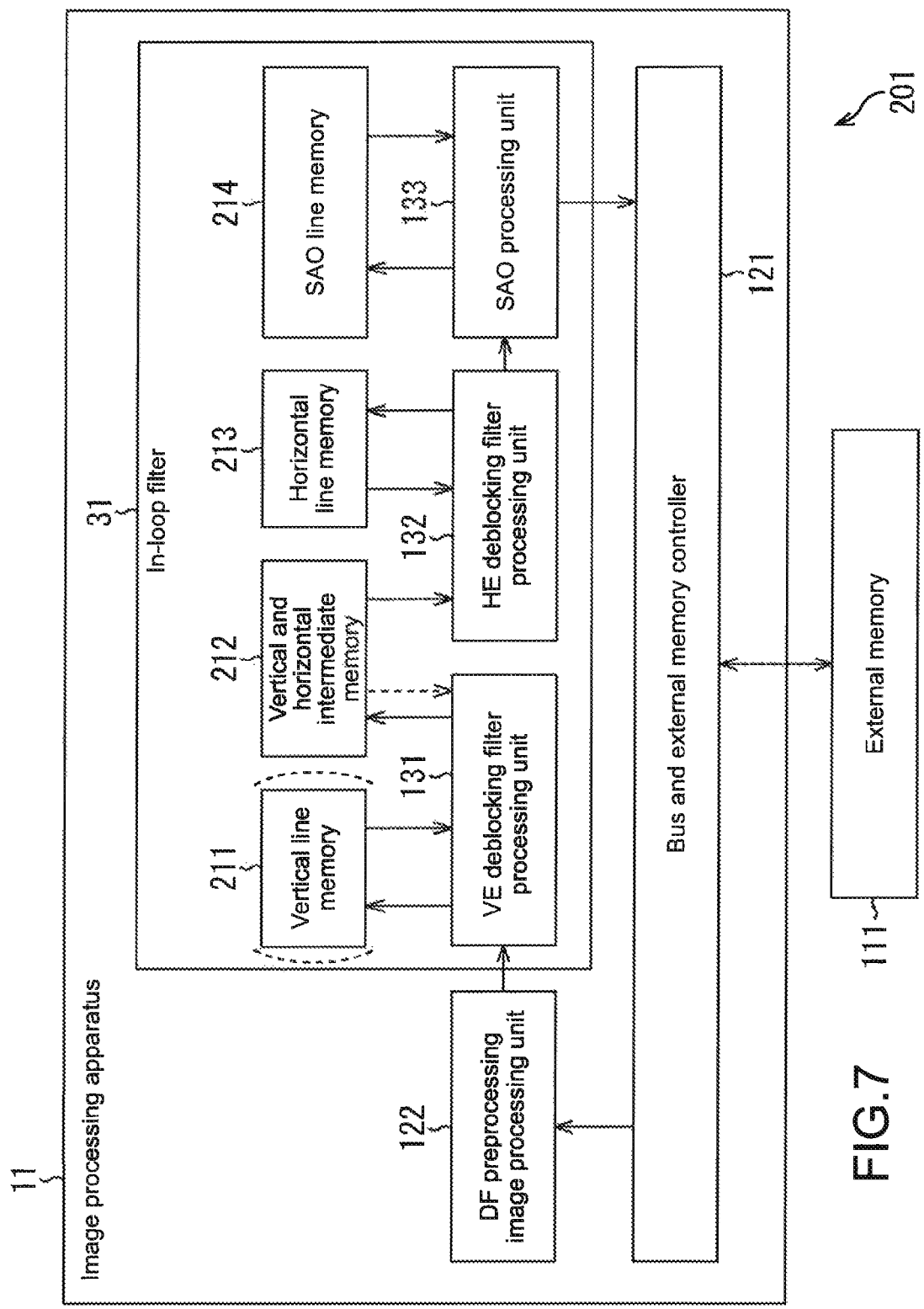
FIG. 7 is a block diagram showing a structural example of the image processing system to which the present technology is applied.

FIG. 7 is a block diagram showing a structural example of an image processing system to which the present technology is applied.

An image processing system 201 shown in FIG. 7 is constituted of the external memory 111 and the image processing apparatus 11 including the bus and external memory controller 121, the DF preprocessing image processing unit 122, and the in-loop filter 31.

However, the image processing system 201 shown in FIG. 7 is different from the image processing system 101 shown in FIG. 6 only in the output destination after the process of the DF preprocessing image processing unit 122 and the structure of the in-loop filter 31.

The in-loop filter 31 shown in FIG. 7 includes the VE deblocking filter processing unit 131, the HE deblocking filter processing unit 132, the SAO processing unit 133, a vertical line memory 211, a vertical and horizontal intermediate memory 212, a horizontal line memory 213, and the SAO line memory 214.

That is, the in-loop filter 31 shown in FIG. 7 is the same as the in-loop filter 31 shown in FIG. 6 in terms of being provided with the VE deblocking filter processing unit 131, the HE deblocking filter processing unit 132, and the SAO processing unit 133. Further, the in-loop filter 31 shown in FIG. 7 is different from the in-loop filter 31 shown in FIG. 6 in that the vertical line memory 211, the vertical and horizontal intermediate memory 212, the horizontal line memory 213, and the SAO line memory 214 are additionally provided thereto.

The vertical line memory 211, the vertical and horizontal intermediate memory 212, the horizontal line memory 213, and the SAO line memory 214 are formed of an SRAM (static random access memory), for example.

It should be noted that the vertical line memory 211 and the vertical and horizontal intermediate memory 212 may be formed of one SRAM. At this time, the vertical line memory 211 can be eliminated. In the case where the vertical line memory 211 is eliminated as indicated by dotted lines in the figure, the picture data is temporarily stored in the vertical and horizontal intermediate memory 212 instead of the vertical line memory 211, the data in the vertical and horizontal intermediate memory 212 is read as indicated by a dotted-line arrow in the figure, and the process by the VE deblocking filter processing unit 131 is performed.

In the example of FIG. 7, the DF preprocessing image processing unit 122 outputs the picture data prior to the deblocking filter not to the bus and external memory controller 121 but to the VE deblocking filter processing unit 131 directly.

That is, the picture data prior to the deblocking filter from the DF preprocessing image processing unit 122 is sequentially input to the VE deblocking filter processing unit 131 for each CU or CTU basis. Depending on a degree of parallelism of the units of the DF preprocessing image processing unit 122, various input units from one pixel input for one clock cycle to multiple pixel input for one clock cycle are possible. In the following description, an example in which 16 (4×4) pixels for one clock cycle are input at the same time will be given.

Figure 8:
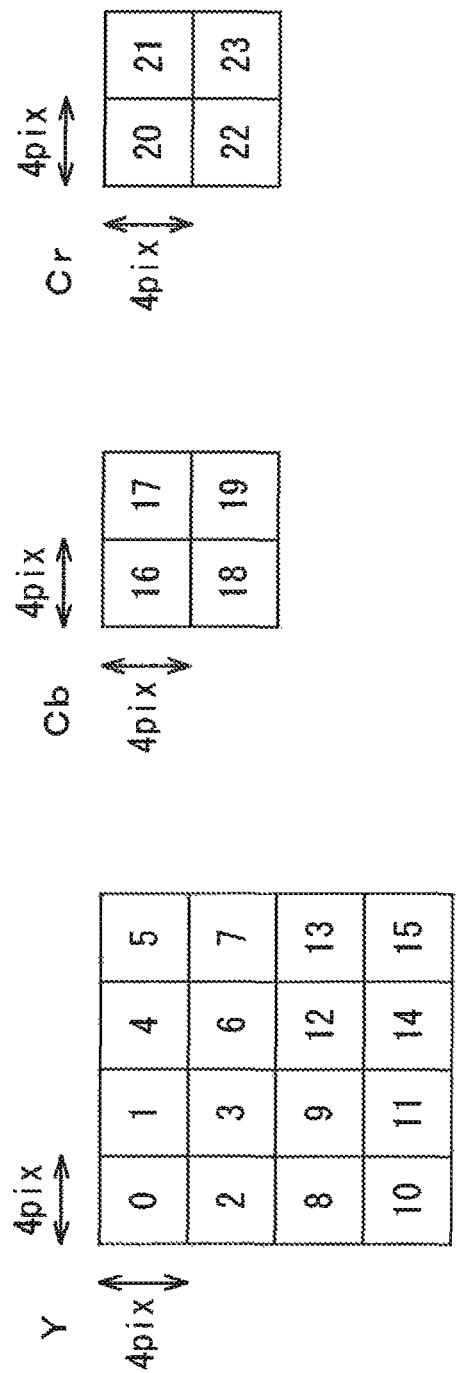
FIG. 8 is a diagram showing an example of an order of inputting data to a VE deblocking filter processing unit.

Further, various multiplication methods for a brightness Y and a color difference Cb/Cr are possible depending on the CU or the CTU. In the following description, as shown in FIG. 8, given is the case where the pipeline process of the DF preprocessing image processing unit 122 is structured so that 16 (4×4) pixels of Y are input 16 times, then 16 (4×4) pixels of Cb are input 4 times, and then 16 (4×4) pixels of Cr are input 4 times.

It should be noted that, in the HEVC, the MB (macro block) does not exist, but a unit in which Y, Cb, and Cr are multiplexed is referred to as MB in this specification. Further, in the in-loop filter 31, the process is performed for each MB. The MB is input to the VR deblocking filter processing unit 131 in accordance with the order of processing of the CTU. Further, hereinafter, the 16 (4×4) pixels may also referred to as block as appropriate.

In the case where the input block is a block, a corresponding block of which on a current vertical edge (as a target for which the process is performed currently) is not input, the VE deblocking filter processing unit 131 temporarily writes the block to the vertical line memory 211. The VE deblocking filter processing unit 131 reads the block written to the vertical line memory 211 at timing when the corresponding block is input, performs the filter process for the current vertical edge, and writes a result to the vertical and horizontal intermediate memory 212.

It should be noted that in this specification, the current vertical edge refers to an area as a process target for which the deblocking filtering is performed with respect to the current vertical edge and includes at least the input block and a block corresponding to the block. Further, the corresponding blocks on the current vertical edge refer to blocks on positions as a pair with an actual edge in the vertical direction indicated by the arrows with numbers 1 and 2 of FIG. 5 sandwiched therebetween on the current vertical edge, for example.

In the case where the HE deblocking filter processing unit 132 inputs the block written to the vertical and horizontal intermediate memory 212, and the input block is a block, a corresponding block of which on a current horizontal edge is not input, the HE deblocking filter processing unit 132 temporarily writes the block to the horizontal line memory 213. At timing when the corresponding block is input, the HE deblocking filter processing unit 132 reads the block written to the horizontal line memory 213, performs the filter process with respect to the current horizontal edge, and outputs a result of the process to the SAO processing unit 133.

It should be noted that in this specification, the current horizontal edge refers to an area as a process target for which the deblocking filtering is performed with respect to the current horizontal edge and includes at least the input block and a block corresponding thereto. Further, the corresponding blocks on the horizontal edge refer to blocks on positions as a pair with an actual edge in the horizontal direction indicated by the arrows with numbers 3 and 4 of FIG. 5 sandwiched therebetween on the current horizontal edge, for example.

The SAO processing unit 133 performs the SAO process of the MB and writes, out of the MBs, a block which is processed after an MB adjacent to the MB on a lower side thereof (hereinafter referred to as lower adjacent MB) is input and a block (pixel) necessary to process the lower adjacent MB to the SAO line memory 214. When the lower adjacent MB is input, the SAO processing unit 133 reads the block written to the SAO line memory 214, performs the SAO process for the lower adjacent MB, and writes a pixel that has been subjected to the process to the external memory 111 through the bus and external memory controller 121.

(Operation of VE Deblocking Filter Processing Unit)

Figure 9:
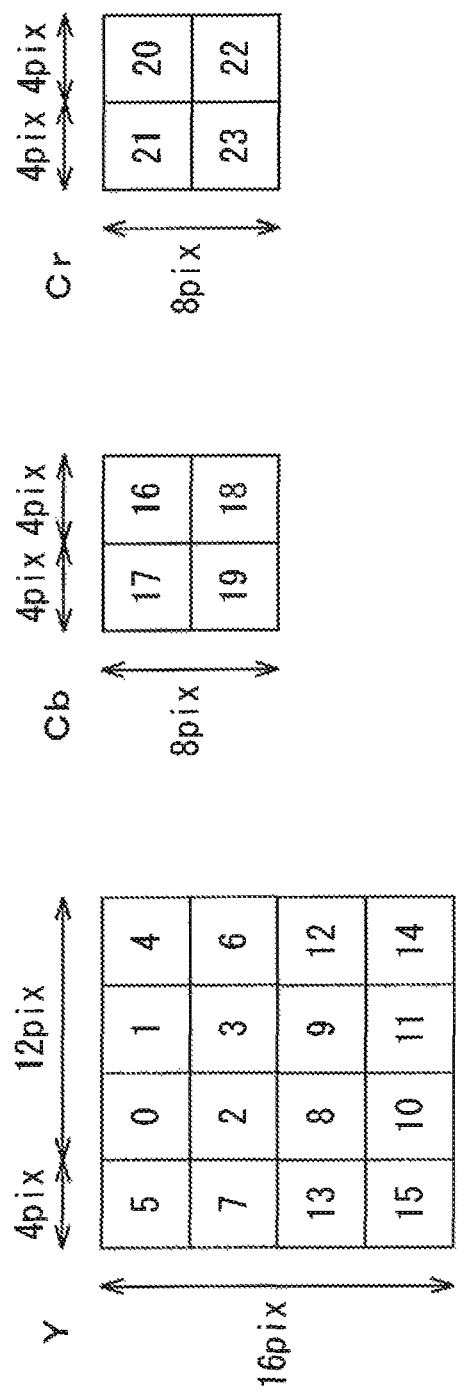
FIG. 9 is a block diagram showing a write state in a vertical and horizontal intermediate memory.
Figure 10:
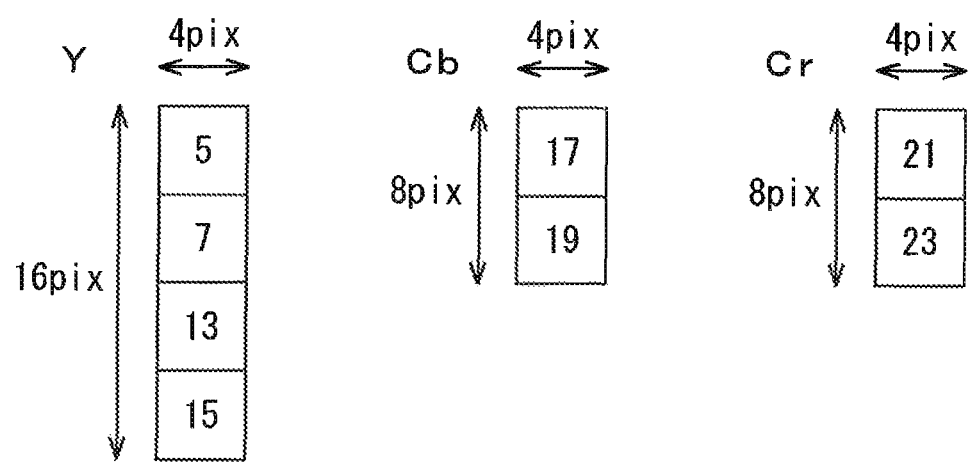
FIG. 10 is a block diagram showing a write state in a vertical line memory.
Figure 11:
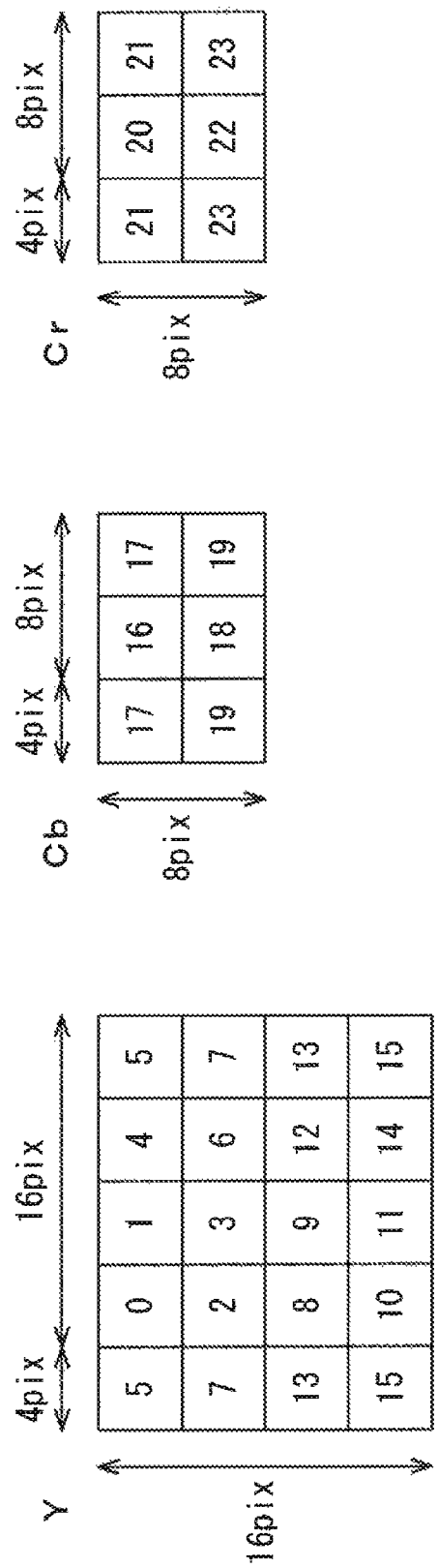
FIG. 11 is a block diagram showing the write state in the vertical and horizontal intermediate memory in the case of a right-end MB of a picture.

First, an operation of the VE deblocking filter processing unit 131 will be described with reference to FIGS. 8 to 11. In FIG. 8, a square indicates 16 (4×4) pixels, and a number added to each square indicates the order of input of data to the VE deblocking filter processing unit 131. FIG. 9 is a diagram showing an example of a write state to the vertical and horizontal intermediate memory 212. FIG. 10 is a diagram showing an example of a write state to the vertical line memory 211. FIG. 11 is a diagram showing an example of a write state to the vertical and horizontal intermediate memory 212 in the case of a right-end MB of a picture.

Because the VE deblocking filter processing unit 131 performs the filter process every horizontal 8-pixel edge, at a time when blocks indicated with numbers 1, 3, 5, 7, 9, 11, 13, 15, 17, 19, 21, and 23 shown in FIG. 8 are input, the corresponding block (on an opposed position as the pair) is not input yet in the MB. Therefore, at this time, the filtering for the vertical edge is difficult to be performed.

In view of this, until pixel data of a block adjacent to each of those blocks on a right side thereof (hereinafter, referred to as right-hand adjacent block) is input, the VE deblocking filter processing unit 131 writes the pixel data of those blocks to the vertical line memory 211. Then, at a time when the pixel data of the right-hand adjacent block of each of the blocks is input, the VE deblocking filter processing unit 131 reads the pixel data written to the vertical line memory 211. The VE deblocking filter processing unit 131 performs the filter process for the vertical edge formed of blocks corresponding to the read blocks.

Specifically, in the case of the example shown in FIG. 8, for the block with number 1, the right-hand adjacent block thereof is a block with number 4 of the MB. For the block with number 3, the right-hand adjacent block thereof is a block with number 6 of the MB. Further, for the block with number 5, the right-hand adjacent block thereof is a block with number 0 of an adjacent MB on the right side. For the block with number 7, the right-hand adjacent block thereof is a block with number 2 of the adjacent MB on the right side.

For the block with number 9, the right-hand adjacent block thereof is a block with number 12 of the MB. For the block with number 11, the right-hand adjacent block thereof is a block with number 14 of the MB. For the block with number 13, the right-hand adjacent block thereof is a block with number 8 of the adjacent MB on the right side. For the block with number 15, the right-hand adjacent block thereof is a block with number 10 of the adjacent MB on the right side.

Further, for the block with number 17, the right-hand adjacent block thereof is a block with number 16 of an adjacent MB on the right side. For the block with number 19, the right-hand adjacent block thereof is a block with number 18 of the adjacent MB on the right side. In the same way, for the block with number 21, the right-hand adjacent block thereof is a block with number 20 of an adjacent MB on the right side. For the block with number 23, the right-hand adjacent block thereof is a block with number 22 of the adjacent MB on the right side.

The VE deblocking filter processing unit 131 sequentially writes the blocks that have been subjected to the filter processes to the horizontal and vertical intermediate memory 212.

For the Y, as shown in FIG. 9, to the horizontal and vertical intermediate memory 212, data of 16×16 pixels obtained by combining 4×16 pixels (that is, four blocks with numbers 5, 7, 13, and 15) on the right side of an MB which is left-hand adjacent to the MB and 12×16 pixels (that is, twelve blocks with numbers 0, 1, 2, 3, 4, 6, 8, 9, 10, 11, 12, and 14) on the left side of the MB is written in numerical order of the blocks on the corresponding positions shown in FIG. 8.

That is, the data of 16×16 pixels shown in FIG. 9 is written in order of the block with number 5 of the left-hand adjacent MB, the block with number 0 of the MB, the block with number 7 of the left-hand adjacent MB, the block with number 2 of the MB, the block with number 1 of the MB, the block with number 4 of the MB, the block with number 3 of the MB, the block with number 6 of the MB, the block with number 13 of the left-hand adjacent MB, the block with number 8 of the MB, the block with number 15 of the left-hand adjacent MB, the block with number 10 of the MB, the block with number 9 of the MB, the block with number 12 of the MB, the block with number 11 of the MB, and the block with number 14 of the MB.

Further, for the Cb, as shown in FIG. 9, to the horizontal and vertical intermediate memory 212, data of 8×8 pixels obtained by combining 4×8 pixels (that is, two blocks with numbers 17 and 19) on the right side of the left-hand adjacent MB and 4×8 pixels (that is, two blocks with numbers 16 and 18) on the left side of the MB is written in numerical order of the blocks on the corresponding positions shown in FIG. 8.

That is, the data of 8×8 pixels of the Cb shown in FIG. 9 is written in order of the block with number 17 of the left-hand adjacent MB, the block with number 16 of the MB, the block with number 19 of the left-hand adjacent MB, and the block with number 18 of the MB.

Similarly, for the Cr, as shown in FIG. 9, to the horizontal and vertical intermediate memory 212, data of 8×8 pixels obtained by combining 4×8 pixels (that is, two blocks with numbers 21 and 23) on the right side of the left-hand adjacent MB and 4×8 pixels (that is, two blocks with numbers 20 and 22) on the left side of the MB is written in numerical order of the blocks on the corresponding positions shown in FIG. 8.

That is, the data of 8×8 pixels of the Cr shown in FIG. 9 is written in order of the block with number 21 of the left-hand adjacent MB, the block with number 20 of the MB, the block with number 23 of the left-hand adjacent MB, and the block with number 22 of the MB.

At a time when the input of the pixel data of 1 MB to the VE deblocking filter processing unit 131 is completed, to the vertical line memory 211, as shown in FIG. 10, the right-hand 4×16 pixels of the Y and the right-hand 4×8 pixels of the Cb and the Cr are stored and wait for the input of the right-hand adjacent blocks thereof to the VE deblocking filter processing unit 131.

It should be noted that, on a right-end MB of the picture, there is no filter process with a right-hand adjacent MB, so the write to the vertical line memory 211 is not generated. In this case, for the Y, as shown in FIG. 11, to the horizontal and vertical intermediate memory 212, data of 20×16 pixels obtained by combining right-hand 4×16 pixels (that is, four blocks with numbers 5, 7, 13, and 15) of a left-hand adjacent MB and 16×16 pixels (that is, sixteen blocks with numbers 0, 1, 2, 3, 4, 6, 8, 9, 10, 11, 12, 14, 5, 7, 13, and 15) of the MB is written.

Further, for the Cb, as shown in FIG. 11, to the horizontal and vertical intermediate memory 212, data of 12×8 pixels obtained by combining right-hand 4×8 pixels (that is, two blocks with numbers 17 and 19) of the left-hand adjacent MB and 8×8 pixels (that is, four blocks with numbers 16, 18, 17, and 19) of the MB is written.

Similarly, for the Cr, as shown in FIG. 11, to the horizontal and vertical intermediate memory 212, data of 12×8 pixels obtained by combining right-hand 4×8 pixels (that is, two blocks with numbers 21 and 23) of the left-hand adjacent MB and 8×8 pixels (that is, four blocks with numbers 20, 22, 21, and 23) of the MB is written.

To perform the processes described above, the vertical line memory 211 only has to store the 4×64 pixels of the Y and the 4×32 pixels of each of the Cb and the Cr in consideration of 64×64 CTU, so the capacity of the vertical line memory 211 has to have 512 Byte (=4×64+4×32×2). For the horizontal and vertical intermediate memory 212, if two sets of 20×16 pixels of the Y and 12×8 pixels of each of the Cb and the Cr are provided as the capacity thereof, the processes can be continued smoothly, so 1024 Byte (=(20× 16+12×8×2)×2) is necessary.

(Operation of HE Deblocking Filter Processing Unit)

Figure 12:
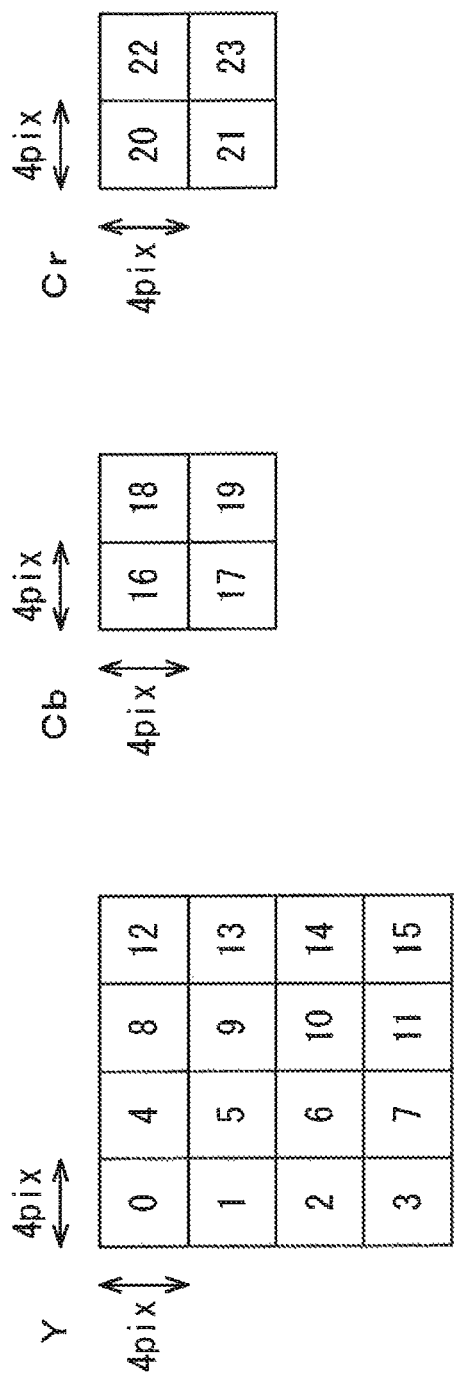
FIG. 12 is a diagram showing an order of reading data in the vertical and horizontal intermediate memory.
Figure 13:
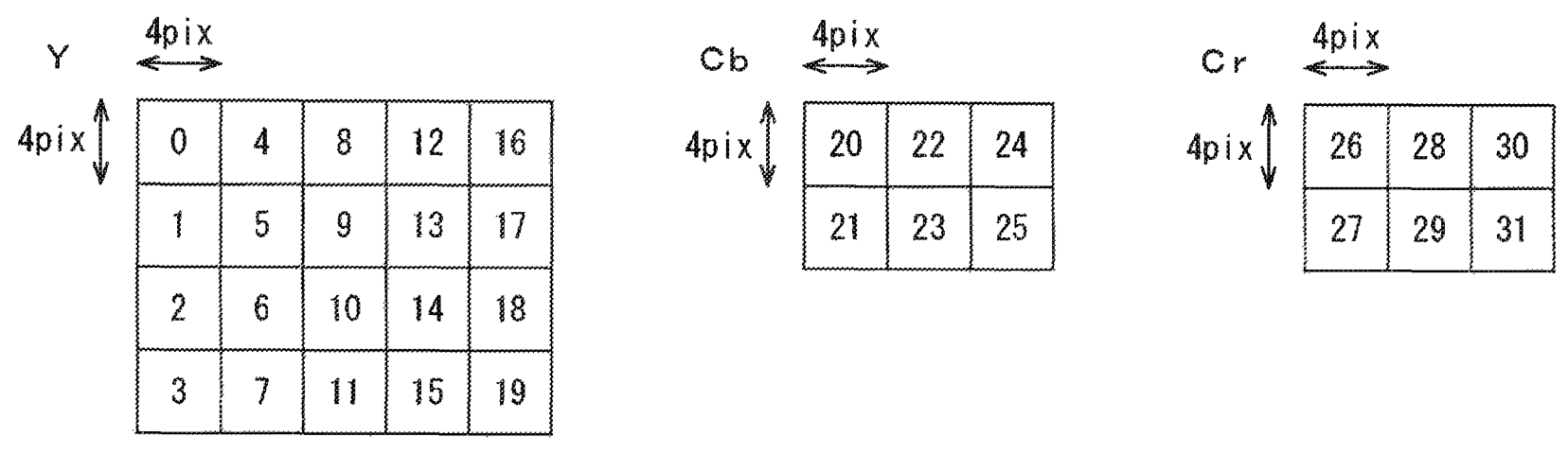

Next, an operation of the HE deblocking filter processing unit 132 will be described with reference to FIGS. 12 and 13. In FIG. 12, a square indicates 16 (4×4) pixels, and a number added to each square indicates the order of reading data of the horizontal and vertical intermediate memory 212. In FIG. 13, a square indicates 16 (4×4) pixels, and a number added to each square indicates the order of reading data of the horizontal and vertical intermediate memory 212 in the case of a right-end MB of a picture.

Because the HE deblocking filter processing unit 132 performs the filter process every vertical 8-pixel edge, the HE deblocking filter processing unit 132 reads the data of the horizontal and vertical intermediate memory 212 in ascending order of the numbers shown in FIG. 12 or 13, that is, in a vertical direction of the MB.

In the case where there is an MB which is adjacent to the MB on an upper side thereof (hereinafter, referred to as upper-adjacent MB), the HE deblocking filter processing unit 132 reads data of lower 4 lines of the upper-adjacent MB from the horizontal line memory 213 at timing when the data of the blocks with the numbers 0, 4, 8, 12, 16, 18, 20, and 22 shown in FIG. 12 is read. The HE deblocking filter processing unit 132 performs the filter process with respect to the horizontal edge formed of the read block and the corresponding block (on an opposed position as the pair).

In the example of FIG. 13, in the case where there is an upper-adjacent MB, the HE deblocking filter processing unit 132 reads data of lower 4 lines of the upper-adjacent MB from the horizontal line memory 213 at timing when the data of the blocks with the numbers 0, 4, 8, 12, 16, 20, 22, 24, 26, 28, and 30 is read, and then performs the filter process on the blocks as the pair.

In the case where there is no upper-adjacent MB, the HE deblocking filter processing unit 132 does not read the data from the horizontal line memory 213.

In the case where the MB is not the lower-end MB of the picture, it may be impossible for the HE deblocking filter processing unit 132 to perform the filtering for the blocks indicated with the numbers 3, 7, 11, 15, 17, 19, 21, and 23 shown in FIG. 12 and the blocks indicated with the numbers 3, 7, 11, 15, 19, 21, 23, 25, 27, 29, and 31 shown in FIG. 13, until an MB adjacent to the corresponding blocks on the lower side (lower-adjacent MB) is input.

In view of this, the HE deblocking filter processing unit 132 writes the pixel data of those blocks to the horizontal line memory 213, until the pixel data of the lower-adjacent MB of those blocks is input. Then, the HE deblocking filter processing unit 132 reads the pixel data written to the horizontal line memory 213 at timing when the pixel data of the lower-adjacent blocks of the blocks is input. The HE deblocking filter processing unit 132 performs the filter process with respect to the horizontal edge formed of the read blocks and the blocks corresponding thereto.

The HE deblocking filter processing unit 132 sequentially outputs the pixel data of the blocks that have been subjected to the filter process to the SAO processing unit 133.

To perform the processes described above, a necessary capacity of the horizontal line memory 213 differs depending on a maximum horizontal pixel count of the picture which can be processed by the image processing apparatus 11. For example, in the case where it is possible to perform the processing for 4096 pixels at the maximum, the 4096×4 pixels of the Y and the 2048×4 pixels of each of the Cb and the Cr are stored, so the capacity thereof is 32 kByte (=(4096×4+2048×4×2)/1024).

It should be noted that as described above, when the MB is not the lower-end MB of the picture, the pixel data of the blocks indicated with the numbers 3, 7, 11, 15, 17, 19, 21, and 23 shown in FIG. 12 and the blocks indicated with the numbers 3, 7, 11, 15, 19, 21, 23, 25, 27, 29, and 31 shown in FIG. 13 is written to the horizontal line memory 213. Out of the lower four lines in the MB for which the filter process is not completed yet, an uppermost line has a value which does not vary by the deblocking filter process with respect to the horizontal edge, and is therefore written to the horizontal line memory 213 and output to the SAO processing unit 133 as comparison pixel data for an edge offset process of the SAO processing unit 133.

It should be noted that only the one uppermost line has the value that does not vary by the filter process, but the data of the lower four lines in the MB may be output to the SAO processing unit 133. In this case, the data of three lines of the lower four lines is overwritten with the data after the filter process.

(Output Method of HE Deblocking Filter Processing Unit)

Figure 14:
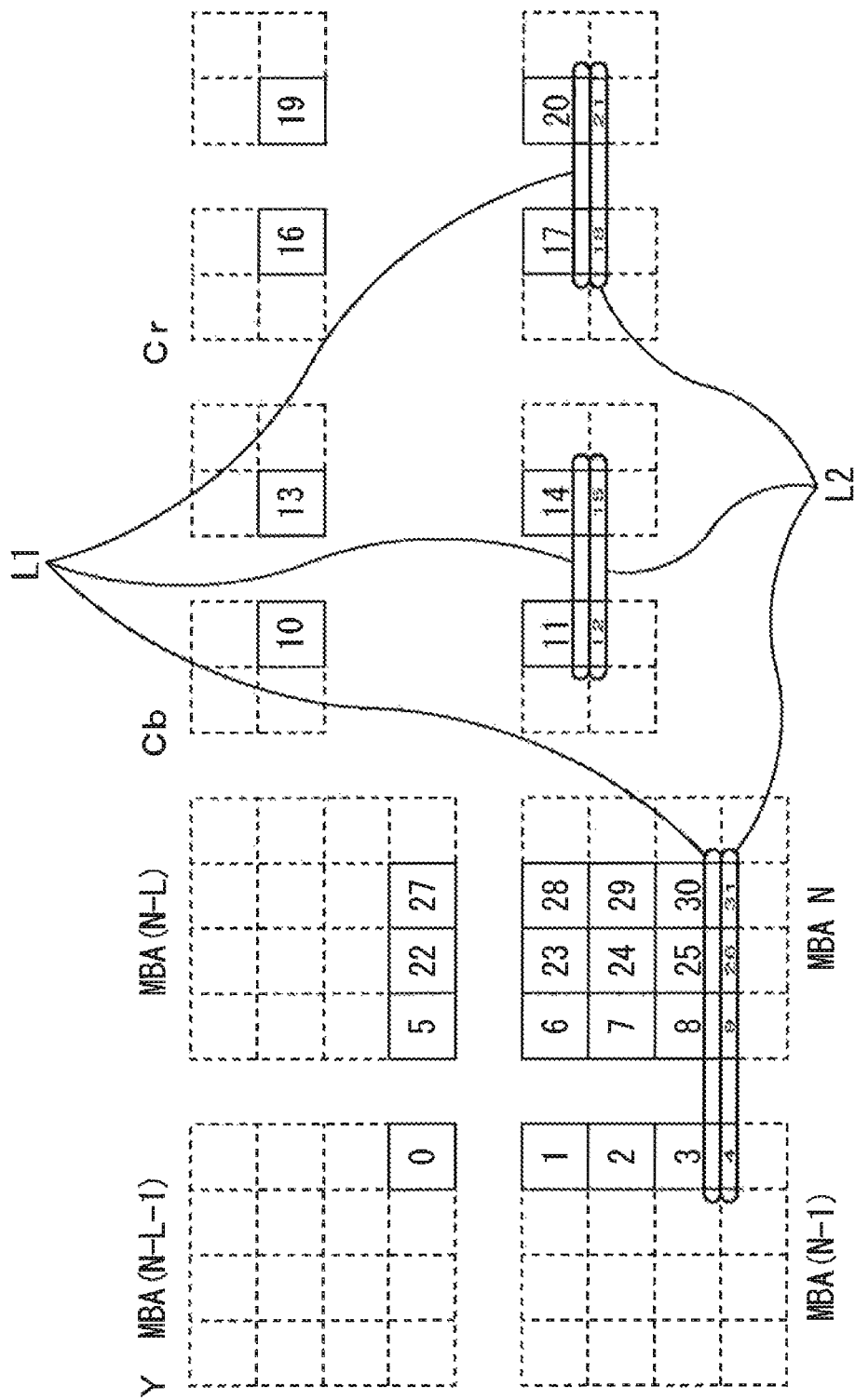
FIG. 14 is a diagram for explaining an output method of an HE deblocking filter processing unit.

FIG. 14 shows an example of order of outputting the blocks in the MB from the HE deblocking filter processing unit 132 in the case where the process area is not on a screen end of the picture.

First, a description will be given on the Y. For example, in the state where a block indicated with number 0 of an MBA (N−L−1), which is disposed on the upper left of the MB, and blocks indicated with numbers 5, 22, and 27 of an MBA (N−L), which is adjacent to the MB on the upper side thereof are written to the horizontal line memory 213, a block indicated with number 1 of an MBA (N−1), which is adjacent to the MB on the left side thereof, is input to the HE deblocking filter processing unit 132.

The HE deblocking filter processing unit 132 reads the block indicated with number 0 from the horizontal line memory 213. Then, the HE deblocking filter processing unit 132 performs the deblocking filter process of the horizontal edge with respect to the block with number 0 and the block with number 1 and outputs those blocks to the SAO processing unit 133.

Then, a block with number 2 and a block with number 3 of the MBA (N−1) as the left-adjacent MB are input to the HE deblocking filter processing unit 132. The HE deblocking filter processing unit 132 performs the deblocking filter process of the horizontal edge for the block with number 2 and the block with number 3 and outputs those blocks to the SAO processing unit 133.

After that, a block with number 4 of the MBA (N−1) as the left-hand adjacent MB is input to the HE deblocking filter processing unit 132. The block with number 4 is difficult to be subjected to the filter process, until an upper right block of an MB adjacent to the MBA (N−1) on the lower side is input, so the block with number 4 is written to the horizontal line memory 213. At this time, one uppermost line of the block with number 4 has a value which does not vary by the deblocking filter process for the horizontal edge and is therefore output to the SAO processing unit 133 as comparison pixel data of an edge offset process of the SAO processing unit 133.

Similarly, a block with number 6 of an MBN N as the MB concerned is input to the HE deblocking filter processing unit 132. The HE deblocking filter processing unit 132 reads the block with number 5 from the horizontal line memory 213. The HE deblocking filter processing unit 132 performs the deblocking filter process of the horizontal edge with respect to the block with number 5 and the block with number 6 and outputs those blocks to the SAO processing unit 133.

Next, a block with number 7 and a block with number 8 of the MBA N are input to the HE deblocking filter processing unit 132 in the stated order. The HE deblocking filter processing unit 132 performs the deblocking filter process of the horizontal edge for the block with number 7 and the block with number 8 and outputs those blocks to the SAO processing unit 133.

After that, a block with number 9 of the MBA N is input to the HE deblocking filter processing unit 132. The block with number 9 is written to the horizontal line memory 213 because the block is difficult to be subjected to the filter process until an upper left block in the lower-adjacent MB of the MBA N is input. At this time, one uppermost line of the block with number 9 has a value which does not vary by the deblocking filter process for the horizontal edge and is therefore output to the SAO processing unit 133 as the comparison pixel data of the edge offset process of the SAO processing unit 133.

A description will be given on the Cb. For example, in the state where a block indicated with number 10 of the MBA (N−L−1), which is disposed on the upper left of the MB, and a block indicated with number 13 of the MBA (N−L), which is adjacent to the MB on the upper side thereof, are written to the horizontal line memory 213, a block indicated with number 11 of the MBA (N−1), which is adjacent to the MB on the left side thereof, is input to the HE deblocking filter processing unit 132.

The HE deblocking filter processing unit 132 reads the block indicated with number 10 from the horizontal line memory 213. Then, the HE deblocking filter processing unit 132 performs the deblocking filter process of the horizontal edge with respect to the block with number 10 and the block with number 11 and outputs those blocks to the SAO processing unit 133.

Then, a block with number 12 of the MBA (N−1) as the left-adjacent MB is input to the HE deblocking filter processing unit 132. The block with number 12 is difficult to be subjected to the filter process until an upper right block of an MB adjacent to the MBA (N−1) on the lower side thereof is input, so the block with number 12 is written to the horizontal line memory 213. At this time, one uppermost line of the block with number 12 has a value which does not vary by the deblocking filter process for the horizontal edge and is therefore output to the SAO processing unit 133 as comparison pixel data of the edge offset process of the SAO processing unit 133.

Similarly, a block with number 14 of the MBN N as the MB concerned is input to the HE deblocking filter processing unit 132. The HE deblocking filter processing unit 132 reads the block with number 13 from the horizontal line memory 213. The HE deblocking filter processing unit 132 performs the deblocking filter process of the horizontal edge with respect to the block with number 13 and the block with number 14 and outputs those blocks to the SAO processing unit 133.

Next, a block with number 15 of the MBA N is input to the HE deblocking filter processing unit 132. The block with number 15 is written to the horizontal line memory 213 because the block is difficult to be subjected to the filter process until an upper left block in the lower-adjacent MB of the MBA N is input. At this time, one uppermost line of the block with number 15 has a value which does not vary by the deblocking filter process for the horizontal edge and is therefore output to the SAO processing unit 133 as the comparison pixel data of the edge offset process of the SAO processing unit 133.

A description will be given on the Cr. For example, in the state where a block indicated with number 16 of the MBA (N−L−1), which is disposed on the upper left of the MB, and a block indicated with number 19 of the MBA (N−L), which is adjacent to the MB on the upper side thereof, are written to the horizontal line memory 213, a block indicated with number 17 of the MBA (N−1), which is adjacent to the MB on the left side thereof, is input to the HE deblocking filter processing unit 132.

The HE deblocking filter processing unit 132 reads the block indicated with number 16 from the horizontal line memory 213. Then, the HE deblocking filter processing unit 132 performs the deblocking filter process of the horizontal edge with respect to the block with number 16 and the block with number 17 and outputs those blocks to the SAO processing unit 133.

Then, a block with number 18 of the MBA (N−1) as the left-adjacent MB is input to the HE deblocking filter processing unit 132. The block with number 18 is difficult to be subjected to the filter process until an upper right block of an MB adjacent to the MBA (N−1) on the lower side thereof is input, so the block with number 18 is written to the horizontal line memory 213. At this time, one uppermost line of the block with number 18 has a value which does not vary by the deblocking filter process for the horizontal edge and is therefore output to the SAO processing unit 133 as comparison pixel data of the edge offset process of the SAO processing unit 133.

Similarly, a block with number 20 of the MBN N as the MB concerned is input to the HE deblocking filter processing unit 132. The HE deblocking filter processing unit 132 reads the block with number 19 from the horizontal line memory 213. The HE deblocking filter processing unit 132 performs the deblocking filter process of the horizontal edge with respect to the block with number 19 and the block with number 20 and outputs those blocks to the SAO processing unit 133.

Next, a block with number 21 of the MBA N is input to the HE deblocking filter processing unit 132. The block with number 21 is written to the horizontal line memory 213 because the block is difficult to be subjected to the filter process until an upper left block in the lower-adjacent MB of the MBA N is input. At this time, one uppermost line of the block with number 21 has a value which does not vary by the deblocking filter process for the horizontal edge and is therefore output to the SAO processing unit 133 as the comparison pixel data of the edge offset process of the SAO processing unit 133.

A description will be given on the Y again. Further, a block with number 23 of the MBA N as the MB concerned is input to the HE deblocking filter processing unit 132. The HE deblocking filter processing unit 132 performs the deblocking filter process of the horizontal edge with respect to the block with number 22 and the block with number 23 and outputs those blocks to the SAO processing unit 133.

Then, a block with number 24 and a block with number 25 of the MBA N are input to the HE deblocking filter processing unit 132 in the stated order. The HE deblocking filter processing unit 132 performs the deblocking filter process of the horizontal edge with respect to the block with number 24 and the block with number 25 and outputs those blocks to the SAO processing unit 133.

After that, a block with number 26 of the MBA N is input to the HE deblocking filter processing unit 132. The block with number 26 is written to the horizontal line memory 213, because the block with number 26 is difficult to be subjected to the filter process until a block which is right-hand adjacent to an upper left block in the lower-adjacent MB of the MBA N is input. At this time, one uppermost line of the block with number 26 has a value that does not vary by the deblocking filter process for the horizontal edge and is therefore output to the SAO processing unit 133 as the comparison pixel data of the edge offset process of the SAO processing unit 133.

Similarly, a block with number 28 of the MBA N as the MB concerned is input to the HE deblocking filter processing unit 132. The HE deblocking filter processing unit 132 reads a block with number 27 from the horizontal line memory 213. The HE deblocking filter processing unit 132 performs the deblocking filter process of the horizontal edge with respect to the block with number 27 and the block with number 28 and outputs those blocks to the SAO processing unit 133.

Then, a block with number 29 and a block with number 30 of the MBA N are input to the HE deblocking filter processing unit 132 in the stated order. The HE deblocking filter processing unit 132 performs the deblocking filter process of the horizontal edge with respect to the block with number 29 and the block with number 30 and outputs those blocks to the SAO processing unit 133.

After that, a block with number 31 of the MBA N is input to the HE deblocking filter processing unit 132. The block with number 31 is written to the horizontal line memory 213, because the block is difficult to be subjected to the filter process until a block which is left-hand adjacent to an upper right block in the lower-adjacent MB of the MBA N is input. At this time, one uppermost line of the block with number 31 has a value that does not vary by the deblocking filter process for the horizontal edge and is therefore output to the SAO processing unit 133 as the comparison pixel data of the edge offset process of the SAO processing unit 133.

As described above, when the blocks with the numbers 4, 9, 12, 15, 18, 21, 26, and 31 are written to the horizontal line memory 213 (that is, before the filter process), one uppermost line of the blocks with numbers 4, 9, 12, 15, 18, 21, 26, and 31, which is indicated as L2 in the figure, is output to the SAO processing unit 133. As a result, it is possible to perform a comparison process of the edge offset process for blocks with numbers 3, 8, 11, 14, 17, 20, 25, and 30, which are indicated as L1, in the SAO processing unit 133 without waiting for the input and process of the blocks in a lower MB thereof.

It should be noted that one lowermost line of the blocks with numbers 3, 8, 11, 14, 17, 20, 25, and 30, which are indicated as L1, is written to the SAO line memory 214, and pixel data of the line is used for the edge offset process when the process is shifted to the lower-adjacent MB.

Further, the one uppermost line of the blocks with numbers 4, 9, 12, 15, 18, 21, 26, and 31, which is indicated as L2, is output to the SAO processing unit 133 from the HE deblocking filter processing unit 132 again when the process is shifted to the lower-adjacent MB.

It should be noted that in this embodiment, it is only necessary to provide 1.5 kByte in total for the vertical line memory 211 and the vertical and horizontal intermediate memory 212, 32 kByte for the horizontal line memory 213, and 8 kByte for the SAO line memory 214.

As described above, with the structure of the in-loop filter shown in FIG. 7, the necessary DRAM band of the entire filter of the in-loop filter 31 is reduced from approximately 38 Gbps to approximately 5.9 Gbps, which is a band for the write by the SAO processing unit 133.

Further, the line memories are provided in the in-loop filter 31 as described above, and the pixel data is written to the line memories, with the result that it is possible to perform a pipeline process in the in-loop filter 31 as follows.

(Pipeline Process for in-Loop Filter)

Figure 15:
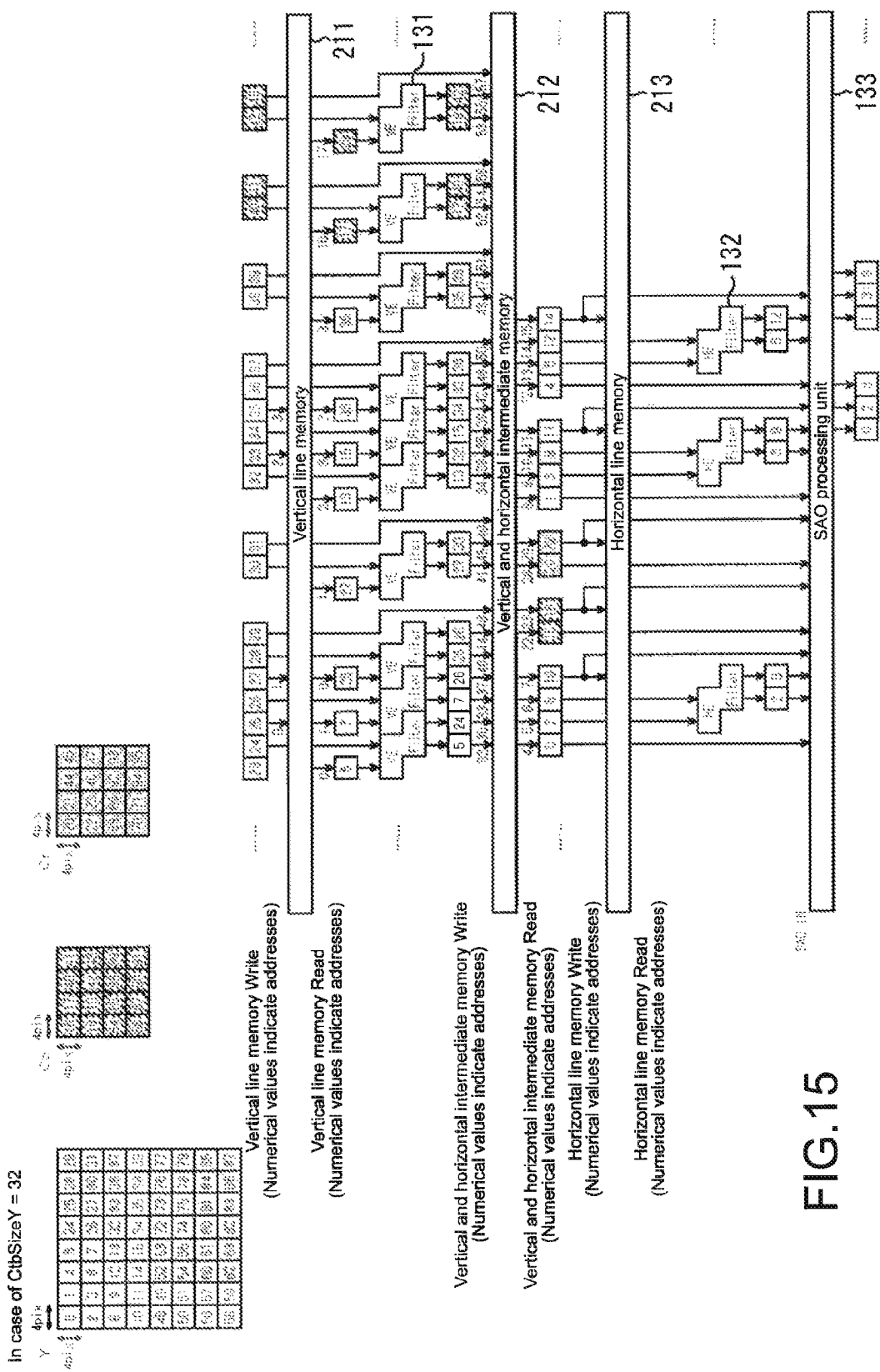
FIG. 15 is a diagram for explaining a pipeline process of an in-loop filter.

Next, with reference to FIG. 15, the pipeline process of the in-loop filter 31 will be described. In an example shown in FIG. 15, the case where a Ctb size of the Y is 32 is shown. For example, a description will be given from that a block indicated with number 24 is input to the VE deblocking filter processing unit 131.

When the block with number 24 of the Y is input to the VE deblocking filter processing unit 131, a block with number 5 is read from an address 0 of the vertical line memory 211. The VE deblocking filter processing unit 131 performs the filter process for the vertical edge of the blocks with numbers 5 and 24 and writes a result of the process to addresses 32 and 36 of the vertical and horizontal intermediate memory 212.

Then, a block with number 25 is written to the address 0 of the vertical line memory 211. Further, when a block with number 26 is input to the VE deblocking filter processing unit 131, a block with number 7 is read from an address 1 of the vertical line memory 211. The VE deblocking filter processing unit 131 performs the filter process for the vertical edge of the blocks with numbers 7 and 26 and writes a result of the process to addresses 33 and 37 of the vertical and horizontal intermediate memory 212.

Further, a block with number 27 is written to the address 1 of the vertical line memory 211. In addition, when a block with number 28 is input to the VE deblocking filter processing unit 131, the block with number 25 is read from the address 0 of the vertical line memory 211. The VE deblocking filter processing unit 131 performs the filter process for the vertical edge of the blocks with numbers 25 and 28 and writes a result to addresses 40 and 44 of the vertical and horizontal intermediate memory 212.

A block with number 29 is disposed on a right end of the picture and is therefore written to an address 48 of the vertical and horizontal intermediate memory 212 as it is without the process by the VE deblocking filter processing unit 131.

During those processes, a block with number 0 is read from the address 4 of the vertical and horizontal intermediate memory 212 and is output as it is to the SAO processing unit 133 without the process by the HE deblocking filter processing unit 132.

Next, from addresses 5 and 6 of the vertical and horizontal intermediate memory 212, blocks with numbers 2 and 8 are read and input to the HE deblocking filter processing unit 132. The HE deblocking filter processing unit 132 performs the filter process for the horizontal edge of the blocks with numbers 2 and 8 and outputs a result of the process to the SAO processing unit 133.

Further, from an address 7 of the vertical and horizontal intermediate memory 212, a block with number 10 is read and written to the horizontal line memory 213, and at least one line thereabove is output as it is to the SAO processing unit 133.

Similarly, from an address 22 of the vertical and horizontal intermediate memory 212, a block with number 16 is read and output as it is to the SAO processing unit 133 without the process by the HE deblocking filter processing unit 132. Further, from an address 23 of the vertical and horizontal intermediate memory 212, a block with number 18 is read and written to the horizontal linen memory 213, and at least one line thereabove is output as it is to the SAO processing unit 133.

Through the above processes, in the in-loop filter 31 shown in FIG. 7, it is possible to perform the pipeline process by the VE deblocking filter processing unit 131, the HE deblocking filter processing unit 132, and the SAO processing unit 133.

(Process of in-Loop Filter)

Figure 16:
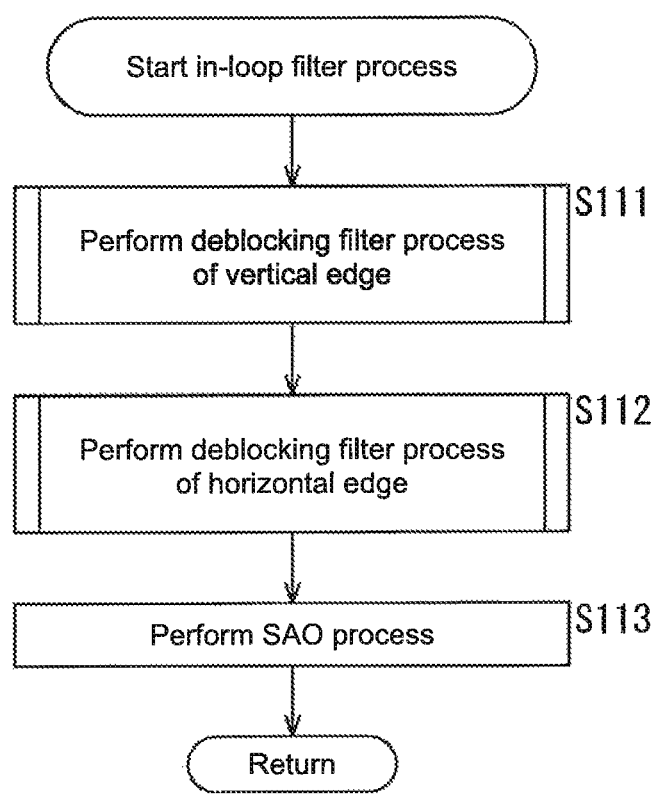
FIG. 16 is a flowchart for explaining an in-loop filter process.

Next, with reference to a flowchart shown in FIG. 16, an in-loop filter process by the in-loop filter 31 shown in FIG. 7 will be described. This is the in-loop filter process in Step S22 of FIG. 2 or Step S58 of FIG. 4.

The DF preprocessing image processing unit 122 (computation unit 30 shown in FIG. 1 or computation unit 65 shown in FIG. 3) supplies decoded image data to the VE deblocking filter processing unit n131 of the in-loop filter 31. For example, pixel data of the coded image is input on a 16×16-pixel basis.

The VE deblocking filter processing unit 131 performs the deblocking filter process of the vertical edge in Step S111. The deblocking filter process of the vertical edge will be described in detail with reference to FIG. 17.

The VE deblocking filter processing unit 131 writes pixel data to the vertical line memory 211 as necessary and performs the deblocking filter process of the vertical edge while performing the read. The pixel data that has been subjected to the VE deblocking filter processing unit 131 is written to the vertical and horizontal intermediate memory 212.

When the data on the 16×16 pixel basis is written to the horizontal and vertical intermediate memory 212, the HE deblocking filter processing unit 132 performs the deblocking filter process of the horizontal edge in Step S112.

Figure 18:
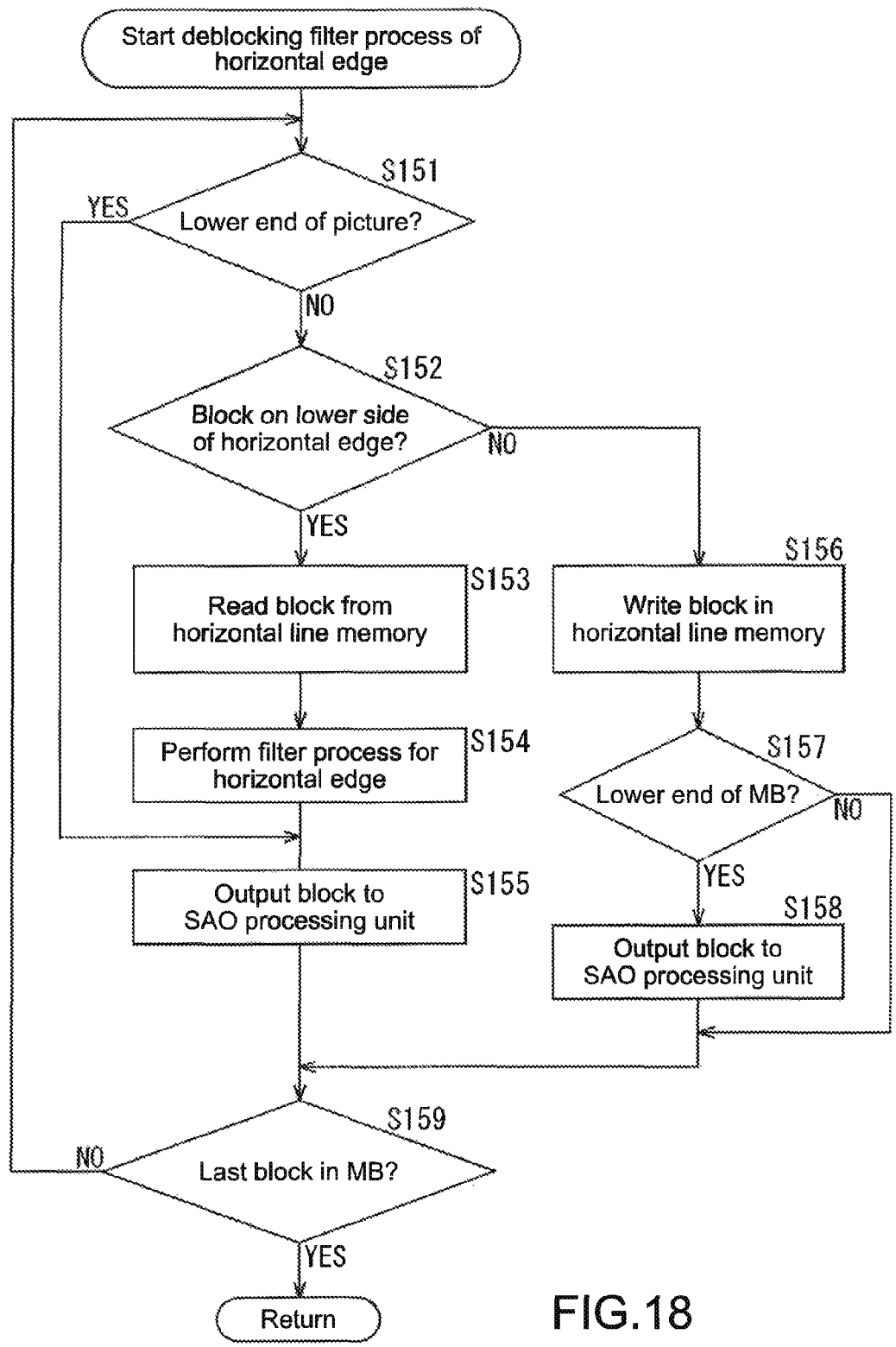
FIG. 18 is a flowchart for explaining an in-loop filter process of a horizontal edge.

The deblocking filter process of the horizontal edge will be described later in detail with reference to FIG. 18. The HE deblocking filter processing unit 132 writes the pixel data to the horizontal line memory 213 as necessary and performs the deblocking filter process of the horizontal edge while performing the read. The pixel data that has been subjected to the HE deblocking filter processing unit 132 is output to the SAO processing unit 133.

The SAO processing unit 133 performs the SAO process in Step S113. The SAO processing unit 133 writes the pixel data to the SAO line memory 214 and performs the SAO process while performing the read.

It should be noted that for the SAO process, a type (edge/band) of the offset and a parameter thereof are determined on the CTU basis, and the process is performed with the use of the determined type and parameter (coding side). Further, on the decoding side, the process is performed with the use of the type and parameter transmitted from the coding side.

However, a parameter such as Trans Quant (no quantization) and a PCM (image data is output without coding) mode are set in a layer (CU level) under the CTU, and a flag indicating that the SAO is not performed is included therein. In the SAO process in such a case, not only the parameter of the CTU but also the parameter of the CU is referred to.

The pixel data that has been subjected to the SAO process is written to the external memory 111 through the bus and external memory controller 121.

It should be noted that, necessary data of the pixel data written to the external memory 111 is read by the DF preprocessing image processing unit 122 (for example, frame memory 32 shown in FIG. 1 or frame memory 69 shown in FIG. 3) and used for a subsequent process.

(Deblocking Filter Process of Vertical Edge)

Figure 17:
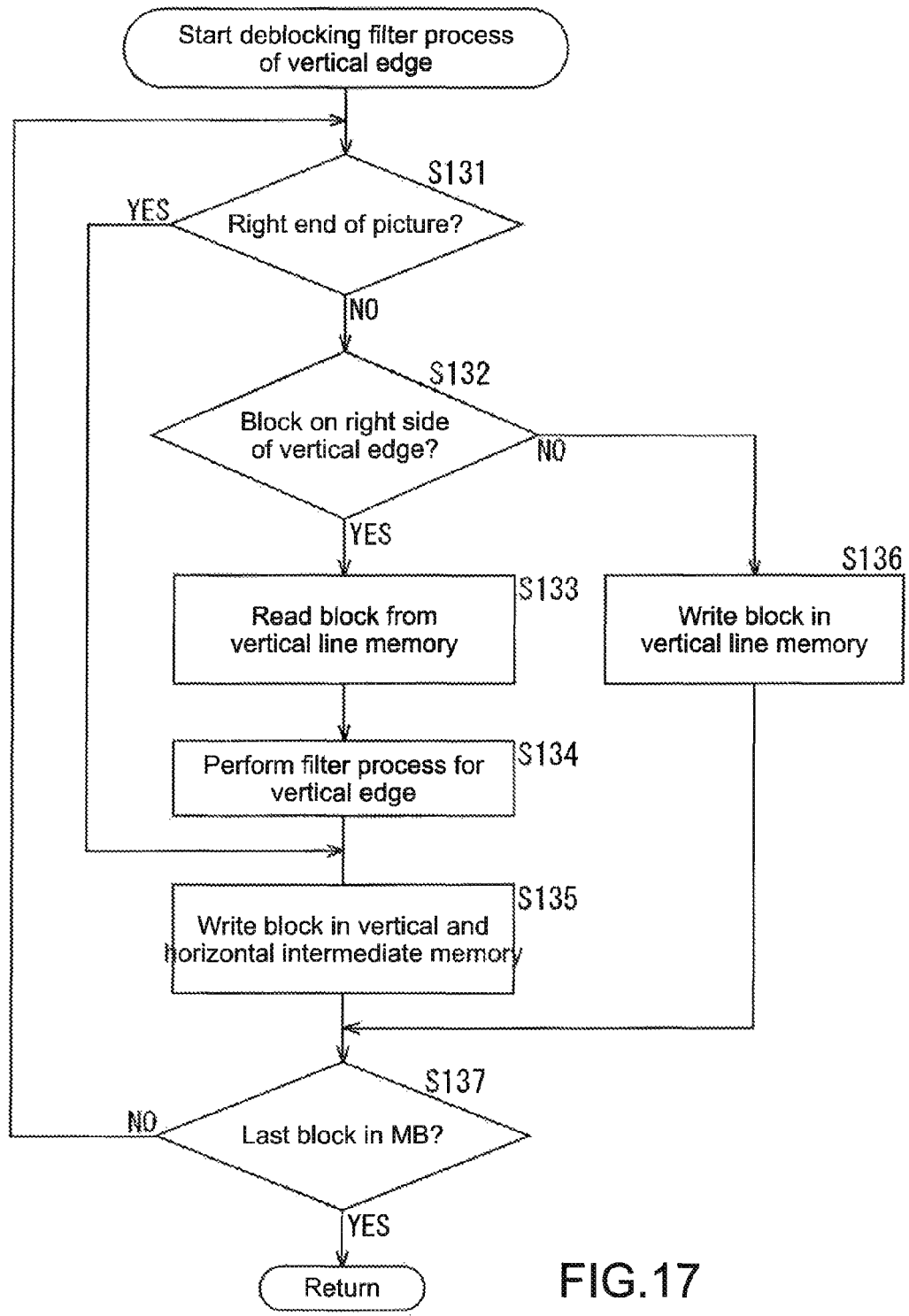
FIG. 17 is a flowchart for explaining a deblocking filter process of a vertical edge.

Next, with reference to a flowchart shown in FIG. 17, the deblocking filter process of the vertical edge in Step S111 of FIG. 16 will be described. The process is performed on the 16×16 pixel (referred to as MB) basis, and 4×4=16 pixels (blocks) are input at the same time in one clock cycle.

In Step S131, the VE deblocking filter processing unit 131 determines whether the block (4×4) in the MB is on the right end of a picture or not. In Step S131, when the block is on the right end of the picture, the process proceeds to Step S135.

In Step S135, the block is written as it is to the vertical and horizontal intermediate memory 212 without the process by the VE deblocking filter processing unit 131.

When it is determined that the block is not on the right end of the picture in Step S131, the process proceeds to Step S132.

In Step S132, the VE deblocking filter processing unit 131 determines whether the block is a block on a right side of a current vertical edge or not. When it is determined that the block is on the right side of the current vertical edge in Step S132, the process proceeds to Step S133. In this case, a block corresponding thereto, which is on a left side of the current vertical edge, is written to the vertical line memory 211 in Step S136 in this process preceding thereto.

In Step S133, the VE deblocking filter processing unit 131 reads the block corresponding thereto, which is on the left side of the current vertical edge, from the vertical line memory 211. In Step S134, the VE deblocking filter processing unit 131 performs the deblocking filter process for the current vertical edge of the block and block read in Step S133.

In Step S135, the VE deblocking filter processing unit 131 writes the block that has been subjected to the filter process to the vertical and horizontal intermediate memory 212.

On the other hand, in the case where it is determined that the block is not the block on the right side of the current vertical edge, that is, the block on the left side thereof in Step S132, the process proceeds to Step S136.

In Step S136, the VE deblocking filter processing unit 131 writes the block to the vertical line memory 211.

In Step S137, the VE deblocking filter processing unit 131 determines whether the block is a last block in the MB or not. When it is determined that the block is the last block in the MB in Step S137, the deblocking filter process of the vertical edge is ended, and the process returns to Step S11 of FIG. 16.

In Step S137, when it is determined that the block is not the last block in the MB, the process returns to Step S131, and the subsequent process is repeatedly performed with respect to the next block.

(Deblocking Filter Process of Horizontal Edge)

Next, with reference to a flowchart shown in FIG. 18, the deblocking filter process of the horizontal edge in Step S112 of FIG. 16 will be described. The process is started at timing when the write on the 16×16 pixels (MB) basis is performed to the vertical and horizontal intermediate memory 212. Further, 16 (4×4) pixels (block) are input at the same time in one clock cycle.

In Step S151, the HE deblocking filter processing unit 132 determines whether the block (4×4) in the MB is on the lower end of a picture or not. In Step S151, when the block is on the lower end of the picture, the process proceeds to Step S155.

In Step S155, the block is output as it is to the SAO processing unit 133 without the process by the HE deblocking filter processing unit 132.

When it is determined that the block is not on the lower end of the picture in Step S151, the process proceeds to Step S152.

In Step S152, the HE deblocking filter processing unit 132 determines whether the block is a block on a lower side of a current horizontal edge or not. When it is determined that the block is on the lower side of the current horizontal edge in Step S152, the process proceeds to Step S153. In this case, a block corresponding thereto, which is on an upper side of the current horizontal edge, is written to the horizontal line memory 213 in Step S156 in this process preceding thereto.

In Step S153, the HE deblocking filter processing unit 132 reads the block corresponding thereto, which is on the upper side of the current horizontal edge, from the horizontal line memory 213. In Step S154, the HE deblocking filter processing unit 132 performs the deblocking filter process for the current horizontal edge of the block and block read in Step S153.

In Step S155, the HE deblocking filter processing unit 132 outputs the block that has been subjected to the filter process to the SAO processing unit 133.

On the other hand, in the case where it is determined that the block is not the block on the lower side of the current horizontal edge, that is, the block on the upper side thereof in Step S152, the process proceeds to Step S156.

In Step S156, the HE deblocking filter processing unit 132 writes the block to the horizontal line memory 213. Then, in Step S157, the HE deblocking filter processing unit 132 determines whether the block is on a lower end of the MB or not. When it is determined that the block is on the lower end of the MB in Step S157, the process proceeds to Step S158. In Step S158, the HE deblocking filter processing unit 132 outputs the block (at least one line thereabove) to the SAO processing unit 133.

Further, when it is determined that the block is on the lower end of the MB in Step S157, Step S158 is skipped, and the process proceeds to Step S159. In Step S159, the HE deblocking filter processing unit 132 determines whether the block is a last block in the MB or not. When it is determined that the block is the last block in the MB in Step S159, the deblocking filter process of the horizontal edge is ended, and the process returns to Step S112 of FIG. 16.

In Step S159, when it is determined that the block is not the last block in the MB, the process returns to Step S151, and the subsequent process is repeatedly performed with respect to the next block.

As described above, according to the present technology, it is possible to reduce the access count to the external memory (DRAM) necessary for the coding or decoding process.

In addition, according to the present technology, it is possible to perform the deblocking filter processes and the SAO process in a pipeline manner. That is, the deblocking filter processes and the SAO process can be performed on the LCU or CU basis which is the same as the image processing pipeline before the previous stage and therefore can be incorporated therein. As a result, it is possible to reduce a delay time before the completion of local decoding.

In the above description, for the coding system, the HEVC system is used as the base. However, the present disclosure is not limited to this, and as the in-loop filter, another coding system or decoding system including a deblocking filter and a sample adaptive offset filter can be used therefor.

It should be noted that, for example, like the HEVC system or the like, the present disclosure can be applied to an image coding apparatus and an image decoding apparatus used at a time when image information (bit stream) compressed by the orthogonal transform such as the discrete cosine transform and the motion compensation via a network medium such as satellite broadcasting, a cable television, the Internet, and a mobile phone. Further, the present disclosure can be applied to an image coding apparatus and an image decoding apparatus used at a time of processing on a storage medium such as an optical disk, a magnetic disk, and a flash memory.

4. Second Embodiment

Personal Computer

The series of processes described above can be implemented by hardware or software. In the case where the series of processes are implemented by the software, a program that configures the software is installed in a computer. Here, examples of the computer include a computer incorporated in dedicated hardware and a general-purpose personal computer capable of executing various functions by installing various programs therein.

Figure 19:
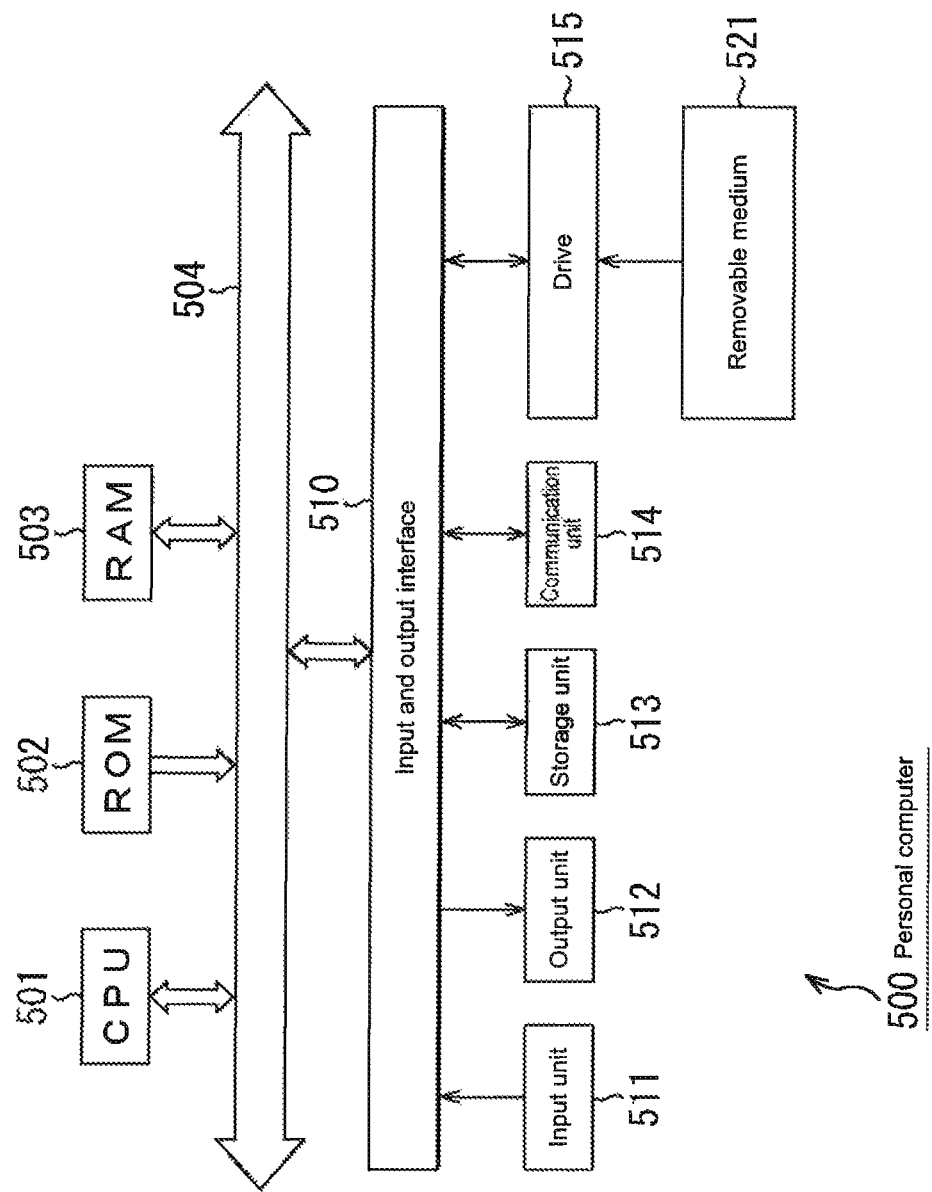
FIG. 19 is a block diagram showing a main structural example of a personal computer.

FIG. 19 is a block diagram showing an example of a hardware structure of a personal computer that executes the series of processes described above by a program.

In a personal computer 500, a CPU (central processing unit) 501, a ROM (read only memory) 502, and a RAM (random access memory) 503 are connected to each other via a bus 504.

To the bus 504, an input and output interface 510 is further connected. To the input and output interface 510, an input unit 511, an output unit 512, a storage unit 513, a communication unit 514, and a drive 515 are connected.

The input unit 511 is constituted of a keyboard, a mouse, a microphone, or the like. The output unit 512 is constituted of a display, a speaker, or the like. The storage unit 513 is constituted of a hard disk, a non-volatile memory, or the like. The communication unit 514 is constituted of a network interface or the like. The drive 515 drives a removable medium 521 such as a magnetic disk, an optical disk, a magneto-optical disk, and a semiconductor memory.

In the personal computer 500 structured as described above, the CPU 501 loads programs stored in the storage unit 513 to the RAM 503 via the input and output interface 510 and the bus 504 and executes the programs, thereby performing the series of processes described above.

The programs executed by the computer (CPU 501) can be provided in the state of being recorded in the removable medium 521 as a package medium or the like formed of a magnetic disk (including flexible disk), an optical disk (CD-ROM (compact disc-read only memory), a DVD (digital versatile disc), or the like), a magneto-optical disk, or a semiconductor memory. Alternatively, the programs can be provided through a wired or wireless transmission medium such as a local area network, the Internet, and digital satellite broadcasting.

In the computer, by loading the removable medium 521 to the drive 515, the program can be installed in the storage unit 513 through the input and output interface 510. In addition, the program can be received by the communication unit 514 via a wired or wireless transmission medium and installed to the storage unit 513. In addition, the program can be installed in the ROM 502 or the storage medium 513 in advance.

It should be noted that the programs executed by the computer may be processed in a chronological order as in the order of explanation in this specification or may be processed in parallel or at necessary timing as in the case of being called, for example.

Further, in this specification, the steps for describing the programs recorded in the recording medium of course includes processes performed in a chronological order as in the order of the description and includes processes performed in parallel or individually without being processed in the chronological order.

Further, in this specification, the system indicates the whole apparatus constituted of the plurality of devices (apparatuses).

Furthermore, in the above, the structure described as one apparatus (or processing unit) may be divided into a plurality of apparatuses (or processing unit). In contrast, the structures described as the plurality of apparatuses (or processing units) may be configured as one apparatus (or processing unit). Further, to the structures of the apparatuses (or processing units), additional structure other than the structures described above may be provided. Further, a part of the structure of a certain apparatus (or processing unit) may be included in the structure of another apparatus (or another processing unit), if the structure and operation of the entire system is equal thereto. That is, the present technology is not limited to the above embodiments and can be variously modified without departing from the gist of the present technology.

The image coding apparatus and the image decoding apparatus according to the above embodiments can be applied to various electronic apparatuses such as a transmitter or a receiver for satellite broadcasting, cable broadcasting such as a cable TV, distribution on the Internet, distribution to a terminal by cellular communication, or the like, a recording apparatus that records images in a medium such as a magnetic disk and a flash memory, and a reproduction apparatus that reproduces the images from those recording media.

Hereinafter, four application examples will be described.

5. Application Examples

First Application Example

Television Receiver

Figure 20:
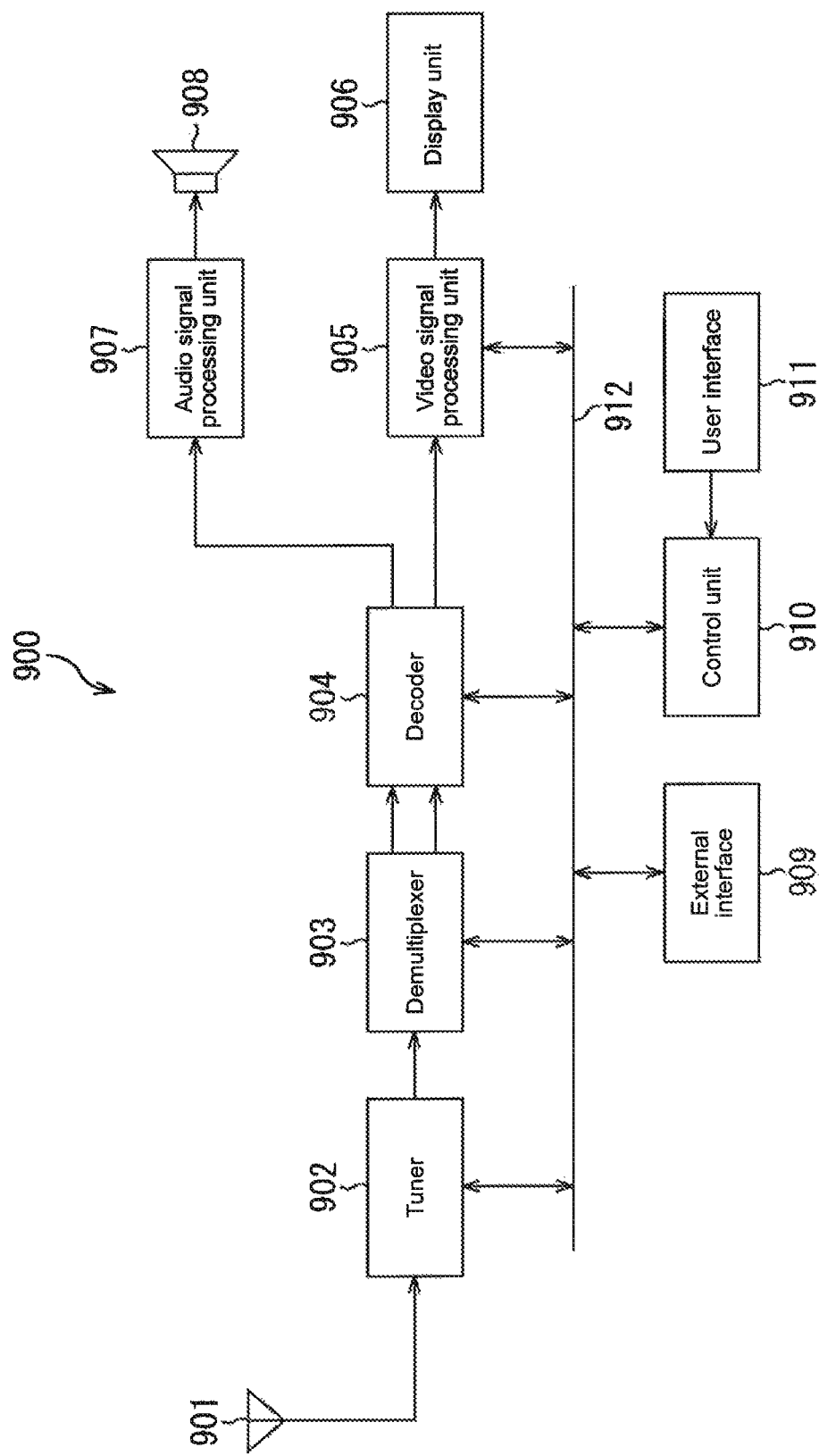
FIG. 20 is a block diagram showing an example of the schematic structure of a television apparatus.

FIG. 20 is a diagram showing an example of the schematic structure of a television apparatus to which the above embodiment is applied. A television apparatus 900 is provided with an antenna 901, a tuner 902, a demultiplexer 903, a decoder 904, a video signal processing unit 905, a display unit 906, an audio signal processing unit 907, a speaker 908, an external interface 909, a control unit 910, a user interface 911, and a bus 912.

The tuner 902 extracts a desired channel signal from a broadcast signal received via the antenna 901 and demodulates the extracted signal. Then, the tuner 902 outputs a coded bit stream obtained by the demodulation to the demultiplexer 903. In other words, the tuner 902 functions as a transmission means in the television apparatus 900, which receives the coded stream in which images are coded.

The demultiplexer 903 separates a video stream and an audio stream of a program as a viewing target from the coded bit stream and outputs the streams separated to the decoder 904. Further, the demultiplexer 903 extracts auxiliary data such as an EPG (electronic program guide) from the coded bit stream and supplies the extracted data to the control unit 910. It should be noted that, when the coded bit stream is scrambled, the demultiplexer 903 may descramble the stream.

The decoder 904 decodes the video stream and the audio stream input from the demultiplexer 903. Then, the decoder 904 outputs video data generated by the decoding process to the video signal processing unit 905. Further, the decoder 904 outputs audio data generated by the decoding process to the video signal processing unit 907.

The video signal processing unit 905 reproduces the video data input from the decoder 904 and causes the display unit 906 to display the video. Further, the video signal processing unit 905 may cause the display unit 906 to display an application screen supplied via a network. Further, the video signal processing unit 905 may perform an additional process such as noise removal with respect to the video data in accordance with setting. Further, the video signal processing unit 905 may generate an image of a GUI (graphical user interface) such as a menu, a button, and a cursor and superimpose the generated image on the output image.

The display unit 906 is driven by a drive signal supplied from the video signal processing unit 905 to display a video or an image on a video screen of a display device (for example, a liquid crystal display, a plasma display, or an OELD (organic electro-luminescence display)).

The audio signal processing unit 907 performs a reproduction process such as D/A conversion and amplification for the audio data input from the decoder 904 and causes the audio to be output from the speaker 908. Further, the audio signal processing unit 907 may perform additional process such as noise removal for the audio data.

The external interface 909 is an interface for connecting the television apparatus 900 with an external apparatus or the network. For example, the video stream or the audio stream received through the external interface 909 may be decoded by the decoder 904. In other words, the external interface 909 also functions as the transmission means in the television apparatus 900, which receives the coded stream in which the images are coded.

The control unit 910 include a processor such as a CPU and a memory such as a RAM and a ROM, The memory stores a program executed by the CPU, program data, EPG data, data obtained via the network, or the like. The program stored in the memory is read and executed by the CPU at a time of activation of the television apparatus 900, for example. The CPU executes the program, thereby controlling the operation of the television apparatus 900 in accordance with an operation signal input from the user interface 911, for example.

The user interface 911 is connected to the control unit 910. The user interface 911 includes a button and a switch for operating the television apparatus 900 by a user and a reception unit for receiving a remote-control signal, and the like. Through those constituent components, the user interface 911 detects the operation by the user, generates the operation signal, and outputs the generated operation signal to the control unit 910.

The bus 912 connects the tuner 902, the demultiplexer 903, the decoder 904, the video signal processing unit 905, the audio signal processing unit 907, the external interface 909, and the control unit 910 with each other.

In the television apparatus 900 structured as described above, the decoder 904 has the function of the image decoding apparatus according to the above embodiments. Therefore, it is possible to reduce the access count to an external memory necessary for the decoding process at a time of decoding an image in the television apparatus 900.

Second Application Example

Mobile Phone

Figure 21:
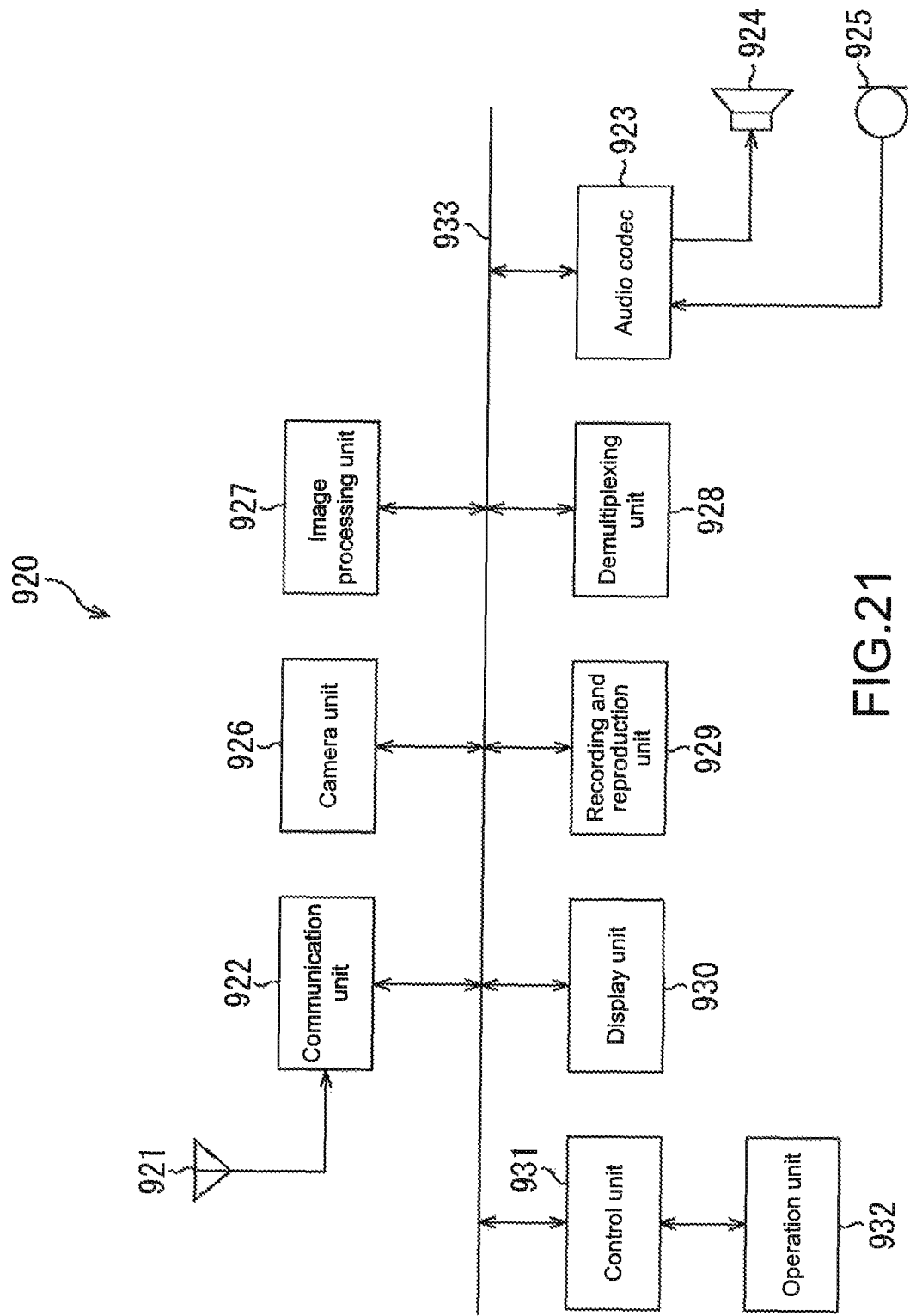
FIG. 21 is a block diagram showing an example of the schematic structure of a mobile phone.

FIG. 21 is a diagram showing an example of the schematic structure of a mobile phone to which the above embodiments are applied. A mobile phone 920 is provided with an antenna 921, a communication unit 922, an audio codec 923, a speaker 924, a microphone 925, a camera unit 926, an image processing unit 927, a demultiplexing unit 928, a recording and reproduction unit 929, a display unit 930, a control unit 931, an operation unit 932, and a bus 933.

The antennal 921 is connected to the communication unit 922. The speaker 924 and the microphone 925 are connected to the audio codec 923. The operation unit 932 is connected to the control unit 931. The bus 933 connects the communication unit 922, the audio codec 923, the camera unit 926, the image processing unit 927, the multiplexing unit 928, the recording and reproduction unit 929, the display unit 930, and the control unit 931 with each other.

The mobile phone 920 performs transmission and reception of an audio signal, transmission and reception of e-mails or image data, image taking, data recording, or the like in various modes including an audio call mode, a data communication mode, an image taking mode, and a videophone mode.

In the audio call mode, an analog audio signal generated by the microphone 925 is supplied to the audio codec 923. The audio codec 923 converts the analog audio signal to audio data and performs A/D conversion for the converted audio data to compress the data. Then, the audio codec 923 outputs the compressed audio data to the communication unit 922. The communication unit 922 codes and modulates the audio data and generates a transmission signal. Then, the communication unit 922 transmits the generated transmission signal to a base station (not shown) via the antenna 921. Further, the transmission unit 922 amplifies a radio signal received via the antenna 921 and performs frequency conversion to obtain a reception signal. Then, the communication unit 922 demodulates and decodes the reception signal to generate the audio data and outputs the generated audio data to the audio codec 923. The audio codec 923 decompresses the audio data and performs the D/A conversion therefor to generate an analog audio signal. Then, the audio codec 923 supplies the generated audio signal to the speaker 924 and causes the speaker 924 to output the audio.

Further, in the data communication mode, for example, the control unit 931 generates character data that forms an e-mail in accordance with an operation of the operation unit 932 by a user. The control unit 931 causes the display unit 930 to display characters. The control unit 931 generates e-mail data in accordance with a transmission instruction from the user through the operation unit 932 and outputs the generated e-mail data to the communication unit 922. The communication unit 922 codes and modulates the e-mail data and generates a transmission signal. Then, the communication unit 922 transmits the generated transmission signal to a base station (not shown) via the antenna 921. The communication unit 922 a radio signal received via the antenna 921 and performs frequency conversion therefor to obtain a reception signal. Then, the communication unit 922 demodulates and decodes the reception signal to restore the e-mail data and outputs the restored e-mail data to the control unit 931. The control unit 931 causes the display unit 930 to display the content of the e-mail and causes a recording medium of the recording and reproduction unit 929 to store the e-mail data.

The recording and reproduction unit 929 includes any readable, writable recording medium. For example, the recording medium may be a built-in recording medium such as a RAM and a flash memory or may be an externally attached recording medium such as a hard disk, a magnetic disk, a magneto-optical disk, an optical disk, a USB (universal serial bus) memory, or a memory card.

Further, in the image taking mode, for example, the camera unit 926 takes an image of a subject, generates image data thereof, and outputs the generated image data to the image processing unit 927. The image processing unit 927 codes the image data input from the camera unit 926 and causes the recording medium of the recording and reproduction unit 929 to store a coded stream.

Further, in the videophone mode, for example, the demultiplexing unit 928 multiplexes a video stream coded by the image processing unit 927 and an audio stream input from the audio codec 923 and outputs the multiplexed stream to the communication unit 922. The communication unit 922 codes and modulates the stream to generate a transmission signal. Then, the communication unit 922 transmits the generated transmission signal to a base station (not shown) via the antenna 921. The communication unit 922 amplifies a radio signal received via the antenna 921 and performs frequency conversion therefor, to obtain a reception signal. The transmission signal and the reception signal can include the coded bit stream. Then, the communication unit 922 demodulates and decodes the reception signal to restore the stream and outputs the restored stream to the demultiplexing unit 928. The demultiplexing unit 928 separates the video stream and the audio stream from the stream input and outputs the video stream and the audio stream to the image processing unit 927 and the video codec 923, respectively. The image processing unit 927 decodes the video stream to generate video data. The video data is supplied to the display unit 930, and the display unit 930 displays a series of images. The audio codec 923 decompresses the audio stream and performs the D/A conversion therefor, to generate an analog audio signal. Then, the audio codec 923 supplies the generated audio signal to the speaker 924 and causes the speaker 924 to output the audio.

In the mobile phone 920 structured as described above, the image processing unit 927 has the function of the image coding apparatus and the image decoding apparatus according to the above embodiments. As a result, it is possible to reduce the access count to the external memory necessary for the coding or decoding process at a time of coding and decoding the image in the mobile phone 920.

Third Application Example

Recording and Reproduction Apparatus

Figure 22:
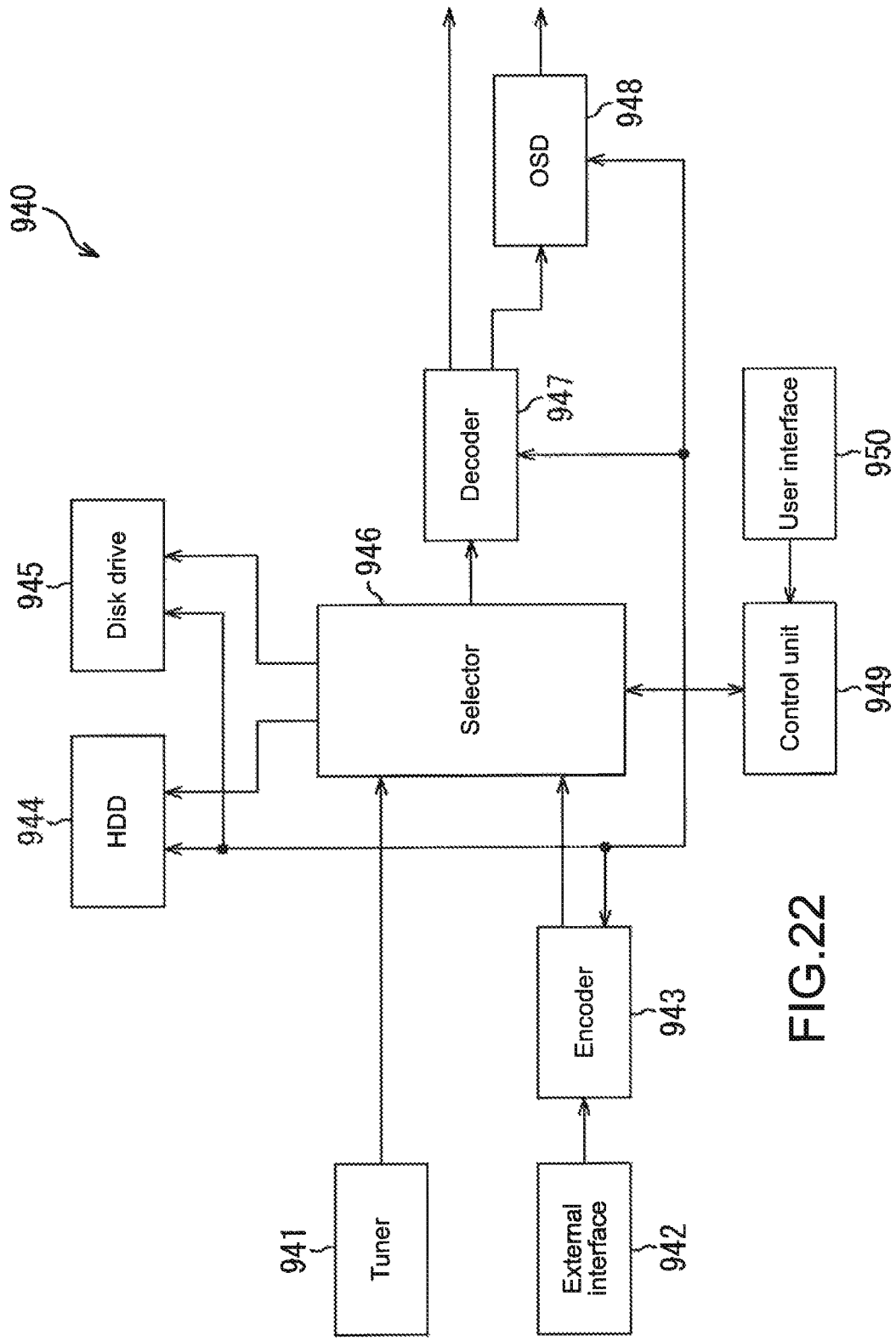
FIG. 22 is a block diagram showing an example of the schematic structure of a recording and reproduction apparatus.

FIG. 22 is a diagram showing an example of the schematic structure of a recording and reproduction apparatus to which the above embodiments are applied. A recording and reproduction apparatus 940 codes audio data and video data of a broadcasting program received and records the coded data in a recording medium, for example. The recording and reproduction apparatus 940 may code audio data and video data obtained from another apparatus and record the coded data in the recording medium, for example. The recording and reproduction apparatus 940 reproduces the data recorded in the recording medium on a monitor and with a speaker in accordance with an instruction of a user. At this time, the recording and reproduction apparatus 940 decodes the audio data and the video data.

The recording and reproduction apparatus 940 is provided with a tuner 941, an external interface 942, an encoder 943, an HDD (hard disk drive) 944, a disk drive 945, a selector 946, a decoder 947, an OSD (on-screen display) 948, a control unit 949, and a user interface 950.

The tuner 941 extracts a desired channel signal from a broadcast signal received via an antenna (not shown) and demodulates the signal extracted. Then, the tuner 941 outputs a coded bit stream obtained by the demodulation to the selector 946. That is, the tuner 941 functions as a transmission means in the recording and reproduction apparatus 940.

The external interface 942 is an interface for connecting the recording and reproduction apparatus 940 with an external apparatus or a network. The external interface 942 may be an IEEE 1394 interface, a network interface, a USB interface, a flash memory interface, or the like. For example, video data and audio data received through the external interface 942 is input to the encoder 943. That is, the external interface 942 has the function as the transmission means in the recording and reproduction apparatus 940.

In the case where the video data and the audio data input from the external interface 942 are not coded, the encoder 943 codes the video data and the audio data. Then, the encoder 943 outputs a coded bit stream to the selector 946.

The HDD 944 records the coded bit stream in which content data such as the video data and the audio data are compressed, various programs, or other data in the hard disk therein. At a time of reproduction of the video and audio, the HDD 944 reads the data from the hard disk.

The disk drive 945 records and reads the data with respect to a recording medium attached thereto. The recording medium attached to the disk drive 945 may be a DVD disk (DVD-video, DVD-RAM, DVD-R, DVD-RW, DVD+R, DVD+RW, or the like) or a Blu-ray (registered trademark) disk, for example.

At a time of recording the video and audio, the selector 946 selects the coded bit stream input from the tuner 941 or the encoder 943 and outputs the selected coded bit stream to the HDD 944 or the disk drive 945. Further, at a time of reproducing the video and audio, the selector 946 outputs the coded bit stream input from the HDD 944 or the disk drive 945 to the decoder 947.

The decoder 947 decodes the coded bit stream to generate video data and audio data. Then, the decoder 947 outputs the generated video data to the OSD 948. Further, the decoder 947 outputs the generated audio data to an external speaker.

The OSD 948 reproduces the video data input from the decoder 947 to display a video. The OSD 948 may superimpose an image of a GUI such as a menu, a button, and a cursor on the video displayed.

The control unit 949 includes a processor such as a CPU and a memory such as a RAM and a ROM. The memory stores a program executed by the CPU, program data, or the like. The program stored in the memory is read and executed by the CPU at a time of activation of the recording and reproduction apparatus 940. The CPU executes the program, thereby controlling the operation of the recording and reproduction apparatus 940 in accordance with an operation signal input from the user interface 950, for example.

The user interface 950 is connected with the control unit 949. The user interface 950 includes a button and a switch for operating the recording and reproduction apparatus 940 by a user, a reception unit of a remote-control signal, and the like. The user interface 950 detects the operation by the user through those constituent components, generates an operation signal, and outputs the generated operation signal to the control unit 949.

In the recording and reproduction apparatus 940 structured as described above, the encoder 943 has the function of the image coding apparatus according to the above embodiments. In addition, the decoder 947 has the function of the image decoding apparatus according to the above embodiments. As a result, it is possible to reduce the access count to the external memory necessary for coding or decoding at a time of coding and decoding the image in the recording and reproduction apparatus 940.

Fourth Application Example

Image Pickup Apparatus

Figure 23:
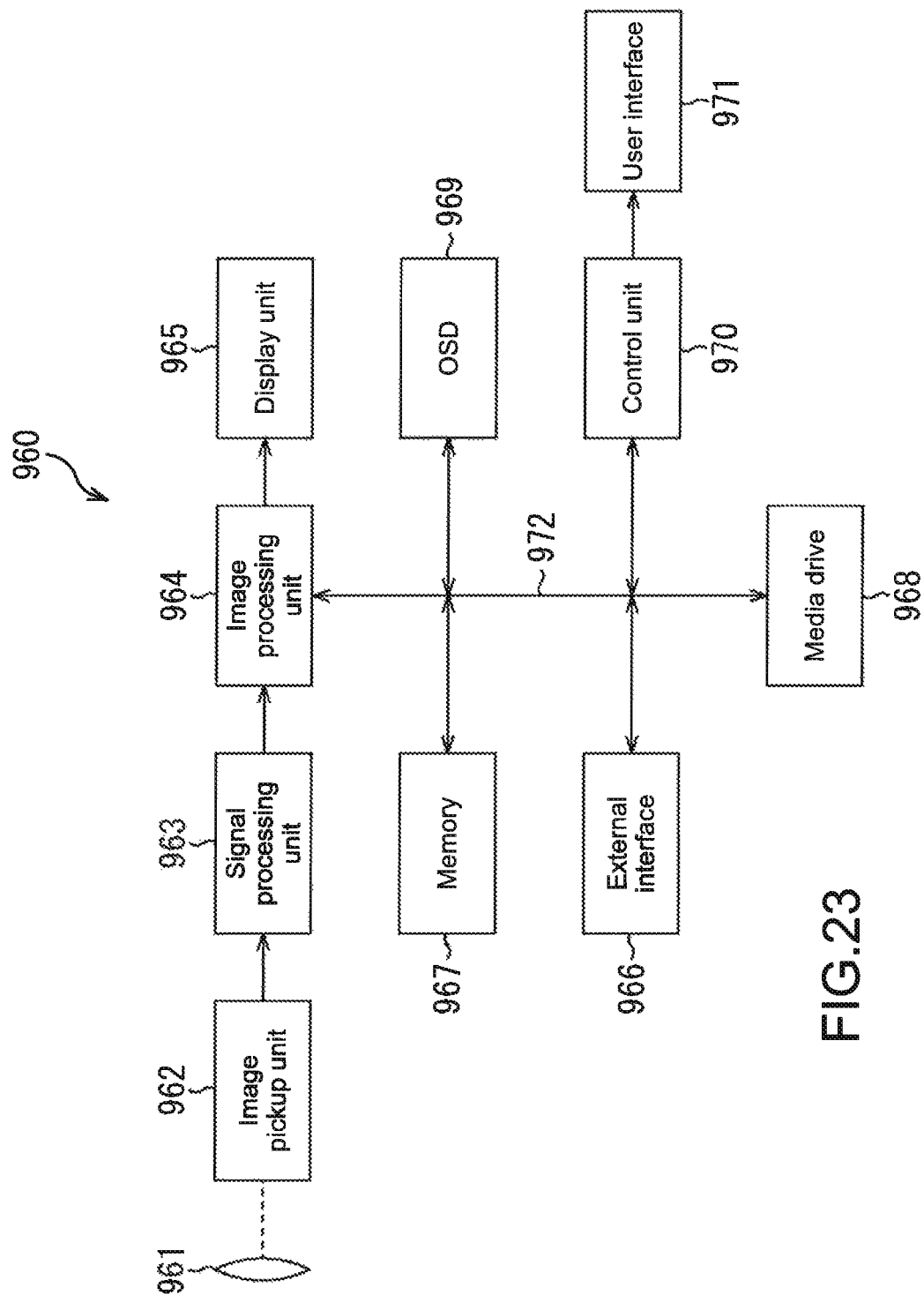
FIG. 23 is a block diagram showing an example of the schematic structure of an image pickup apparatus.

FIG. 23 is a diagram showing an example of the schematic structure of an image pickup apparatus to which the above embodiments are applied. An image pickup apparatus 960 takes an image of a subject to generate an image, codes image data, and records the image data in a recording medium.

The image pickup apparatus 960 is provided with an optical block 961, an image pickup unit 962, a signal processing unit 963, an image processing unit 964, a display unit 965, an external interface 966, a memory 967, a media drive 968, an OSD 969, a control unit 970, a user interface 971, and a bus 972.

The optical block 961 is connected to the image pickup unit 962. The image pickup unit 962 is connected to the signal processing unit 963. The display unit 965 is connected to the image processing unit 964. The user interface 971 is connected to the control unit 970. The bus 972 connects the image processing unit 964, the external interface 966, the memory 967, the media drive 968, the OSD 969, and the control unit 970 with each other.

The optical block 961 includes a focus lens, a diaphragm mechanism, and the like. The optical block 961 forms an optical image of the subject on an image pickup surface of the image pickup unit 962. The image pickup unit 962 includes an image sensor such as a CCD (charge coupled device) and a CMOS (complementary metal oxide semiconductor) and converts the optical image formed on the image pickup surface into an image signal as an electrical signal by photoelectric conversion. Then, the image pickup unit 962 outputs the image signal to the signal processing unit 963.

The signal processing unit 963 performs various camera signal processes such as a knee correction, a gamma correction, and a color correction with respect to the image signal input from the image pickup unit 962. The signal processing unit 963 outputs the image data that has been subjected to the camera signal processes to the image processing unit 964.

The image processing unit 964 codes the image data input from the signal processing unit 963 to generate coded data. Then, the image processing unit 964 outputs the generated coded data to the external interface 966 or the media drive 968. Further, the image processing unit 964 decodes the coded data input from the external interface 966 or the media drive 968 to generate image data. Then, the image processing unit 964 outputs the generated image data to the display unit 965. The image processing unit 964 may output the image data input from the signal processing unit 963 to the display unit 965 and cause the display unit 965 to display an image. The image processing unit 964 may superimpose display data obtained from the OSD 969 on the image output to the display unit 965.

The OSD 969 generates an image of a GUI such as a menu, a button, or a cursor and outputs the generated image to the image processing unit 964.

The external interface 966 is formed as a USB input and output terminal, for example. The external interface 966 connects the image pickup apparatus 960 with a printer at a time of printing an image. Further, to the external interface 966, a drive is connected when necessary. To the drive, a removable medium such as a magnetic disk and an optical disk is mounted. A program read from the removable medium can be installed to the image pickup apparatus 960. Further, the external interface 966 may be formed as a network interface connected to a network such as a LAN and the Internet. That is, the external interface 966 functions as a transmission means in the image pickup apparatus 960.

The recording medium mounted on the media drive 968 may be any readable, writable removable medium such as a magnetic disk, a magneto-optical disk, an optical disk, and a semiconductor memory. Further, to the media drive 968, the recording medium may be fixedly mounted to form a non-portable recording unit such as a built-in hard disk and an SSD (solid state drive).

The control unit 970 includes a processor such as a CPU and a memory such as a RAM and a ROM. The memory stores a program executed by the CPU, program data, or the like. The program stored in the memory is read and executed by the CPU at a time of activation of the image pickup apparatus 960, for example. The CPU controls an operation of the image pickup apparatus 960 in accordance with an operation signal input from the user interface 971 by executing the program, for example.

The user interface 971 is connected with the control unit 970. The user interface 971 includes a button, a switch, or the like for operating the image pickup apparatus 960 by a user, for example. The user interface 971 detects the operation by the user through those constituent components to generate an operation signal and outputs the generated operation signal to the control unit 970.

In the image pickup apparatus 960 structured as described above, the image processing unit 964 has the function of the image coding apparatus and the image decoding apparatus according to the above embodiments. As a result, it is possible to reduce the access count to the external memory necessary for the coding or decoding at a time of coding and decoding of the image in the image pickup apparatus 960.

It should be noted that in this specification, the example in which the filtering process for the vertical edge is performed before the filtering process for the horizontal edge is mainly given. The above-described effect by the technology according to the present disclosure can be enjoyed also in the case where the filtering process for the horizontal edge is performed first. Further, the size of the deblocking filter in the processing unit or the size of the LCU is not limited to the examples in this specification, and a different size may be used.

It should be noted that in this specification, various pieces of information such as the parameters are multiplexed to the coded stream and are transmitted from the coding side to the decoding side. However, the way of transmitting those pieces of information is not limited to the example described above. For example, those pieces of information may be transmitted or recorded as individual pieces of data related to the coded bit stream without being multiplexed to the coded bit stream. Here, the term "relate to" means that an image (which may be a part of the image, such as a slice and a block) included in the bit stream can be linked with information corresponding to the information at a time of decoding. That is, the information may be transmitted on a transmission channel different from the image (or the bit stream). Further, the information may be recorded in a recording medium different from the image (or the bit stream) (or a different recording area in the same recording medium). Further, the information and the image (or the bit stream) may be related to each other on any basis such as a plurality of frames, one frame, and a part in the frame.

The embodiments of the present disclosure are described above with reference to the attached drawings. However, the present disclosure is not limited to the above examples. It is obvious that those skilled in the art to which the present disclosure belongs can conceive various modified examples within the scope of the technical idea described in the scope of the appended claims, and it is understood that those examples of course belong to the technical scope of the present disclosure.

It should be noted that the present disclosure can take the following configurations.

(1) An image processing apparatus, including:

a decoding unit configured to perform a decoding process for a coded stream to generate an image;

a deblocking filter configured to store a block, a corresponding block of which on a current edge is not input, in a memory, out of blocks of the image generated by the decoding unit and read the block stored in the memory at timing when the corresponding block is input, to perform a filter process; and a sample adaptive offset processing unit configured to perform a sample adaptive offset process by using a pixel of the block that has been subjected to the filter process by the deblocking filter.

(2) The image processing apparatus according to Item (1), in which the deblocking filter stores, in the memory, a block disposed on a left side of a current vertical edge, out of the blocks of the image generated by the decoding unit, and reads the block stored in the memory at timing when a block disposed on a right side of the vertical edge is input, to perform the filter process.

(3) The image processing apparatus according to Item (1), in which the deblocking filter stores, in the memory, a block disposed on an upper side of a current horizontal edge, out of the blocks of the image generated by the decoding unit, and reads the block stored in the memory at timing when a block disposed on a lower side of the horizontal edge is input, to perform the filter process.

(4) The image processing apparatus according to any one of Items (1) to (3), in which the deblocking filter stores the block, the corresponding block of which on the current edge is not input, in the memory, out of the blocks of the image generated by the decoding unit, and outputs a pixel on at least an uppermost line of the block to the sample adaptive offset processing unit.

(5) An image processing method, including:

performing a decoding process for a coded stream to generate an image, by an image processing apparatus;

storing a block, a corresponding block of which on a current edge is not input, in a memory, out of blocks of the image generated and reading the block stored in the memory at timing when the corresponding block is input, to perform a filter process, by the image processing apparatus; and performing a sample adaptive offset process by using a pixel of the block that has been subjected to the filter process, by the image processing apparatus.

(6) An image processing apparatus, including:

a deblocking filter configured to store a block, a corresponding block of which on a current edge is not input, in a memory, out of blocks of an image for which a local decoding process is performed at a time of image coding and read the block stored in the memory at timing when the corresponding block is input, to perform a filter process;

a sample adaptive offset processing unit configured to perform a sample adaptive offset process by using a pixel of the block that has been subjected to the filter process by the deblocking filter; and a coding unit configured to code the image by using the pixel that has been subjected to the sample adaptive offset process by the sample adaptive offset processing unit.

(7) The image processing apparatus according to Item (6), in which the deblocking filter stores, in the memory, a block disposed on a left side of a current vertical edge, out of the blocks of the image for which the local decoding process is performed at the time of image coding, and reads the block stored in the memory at timing when a block disposed on a right side of the vertical edge is input, to perform the filter process.

(8) The image processing apparatus according to Item (6), in which the deblocking filter stores, in the memory, a block disposed on an upper side of a current horizontal edge, out of the blocks of the image for which the local decoding process is performed at the time of image coding, and reads the block stored in the memory at timing when a block disposed on a lower side of the horizontal edge is input, to perform the filter process.

(9) The image processing apparatus according to any one of Items (6) to (8), in which the deblocking filter stores the block, the corresponding block of which on the current edge is not input, in the memory, out of the blocks of the image for which the local decoding process is performed at the time of image coding, and outputs a pixel on at least an uppermost line of the block to the sample adaptive offset processing unit.

(10) An image processing method, including:

storing a block, a corresponding block of which on a current edge is not input, in a memory, out of blocks of an image for which a local decoding process is performed at a time of image coding and reading the block stored in the memory at timing when the corresponding block is input, to perform a filter process, by an image processing apparatus;

performing a sample adaptive offset process by using a pixel of the block that has been subjected to the filter process, by the image processing apparatus; and coding the image by using the pixel that has been subjected to the sample adaptive offset process, by the image processing apparatus.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising:
a decoding unit configured to perform a decoding process for a coded stream to generate an image;
a deblocking filter having a vertical edge deblocking filter and a horizontal edge deblocking filter and configured to sequentially store a block, a corresponding block of which on a current edge is not input, in each memory of a plurality of memories including a vertical memory associated with the vertical edge deblocking filter, a horizontal memory associated with the horizontal edge deblocking filter, and a vertical and horizontal intermediate memory configured between the vertical memory and the horizontal memory and associated with both the vertical edge deblocking filter and the horizontal edge deblocking filter, out of blocks of the image generated by the decoding unit, and read the block sequentially stored in each memory of the plurality of memories including the vertical memory, the horizontal memory, and the vertical and horizontal intermediate memory at timing when the corresponding block is input into one or more of the vertical edge deblocking filter and the horizontal edge deblocking filter, to perform a filter process; and
a sample adaptive offset processing unit configured to perform a sample adaptive offset process by using a pixel of the block that has been subjected to the filter process by the deblocking filter,
wherein the decoding unit, the deblocking filter, and the sample adaptive offset processing unit are each implemented via at least one processor.

2. The image processing apparatus according to claim 1, wherein the deblocking filter stores, in the vertical and horizontal intermediate memory, a block disposed on a left side of a current vertical edge, out of the blocks of the image generated by the decoding unit, and reads the block stored in the vertical and horizontal intermediate memory at timing when a block disposed on a right side of the vertical edge is input, to perform the filter process.

3. The image processing apparatus according to claim 1, wherein the deblocking filter stores, in the vertical and horizontal intermediate memory, a block disposed on an upper side of a current horizontal edge, out of the blocks of the image generated by the decoding unit, and reads the block stored in the vertical and horizontal intermediate memory at timing when a block disposed on a lower side of the horizontal edge is input, to perform the filter process.

4. The image processing apparatus according to claim 1, wherein the deblocking filter stores the block, the corresponding block of which on the current edge is not input, in the vertical and horizontal intermediate memory, out of the blocks of the image generated by the decoding unit, and outputs a pixel on at least an uppermost line of the block to the sample adaptive offset processing unit.

5. The image processing apparatus according to claim 1, wherein sequentially storing the block comprises storing the block in the vertical memory while the corresponding block along a vertical edge is input into the vertical edge deblocking filter, inputting a vertical result of the vertical edge deblocking filter for the block to the vertical and horizontal intermediate memory, storing the vertical result for the block in the vertical and horizontal intermediate memory while each corresponding block along the vertical edge is input into the vertical edge deblocking filter until the corresponding block along a horizontal edge is input into the horizontal edge deblocking filter, inputting a horizontal result of the horizontal edge deblocking filter for the block to the horizontal memory, and storing the horizontal result for the block in the horizontal memory while each corresponding block along the horizontal edge is input into the horizontal edge deblocking filter.

6. An image processing method, implemented via at least one processor, the method comprising:
performing a decoding process for a coded stream to generate an image, by an image processing apparatus;
sequentially storing a block, a corresponding block of which on a current edge is not input, in each memory of a plurality of memories including a vertical memory associated with the vertical edge deblocking filter, a horizontal memory associated with the horizontal edge deblocking filter, and a vertical and horizontal intermediate memory configured between the vertical memory and the horizontal memory and associated with both a vertical edge deblocking filter and a horizontal edge deblocking filter, out of blocks of the image generated, and reading the block sequentially stored in each memory of the plurality of memories including the vertical memory, the horizontal memory, and the vertical and horizontal intermediate memory at timing when the corresponding block is input into one or more of the vertical edge deblocking filter and the horizontal edge deblocking filter, to perform a filter process, by the image processing apparatus; and performing a sample adaptive offset process by using a pixel of the block that has been subjected to the filter process, by the image processing apparatus.

7. The image processing method according to claim 6, wherein sequentially storing the block comprises storing the block in the vertical memory while the corresponding block along a vertical edge is input into the vertical edge deblocking filter, inputting a vertical result of the vertical edge deblocking filter for the block to the vertical and horizontal intermediate memory, storing the vertical result for the block in the vertical and horizontal intermediate memory while each corresponding block along the vertical edge is input into the vertical edge deblocking filter until the corresponding block along a horizontal edge is input into the horizontal edge deblocking filter, inputting a horizontal result of the horizontal edge deblocking filter for the block to the horizontal memory, and storing the horizontal result for the block in the horizontal memory while each corresponding block along the horizontal edge is input into the horizontal edge deblocking filter.

8. An image processing apparatus, comprising:
a deblocking filter having a vertical edge deblocking filter and a horizontal edge deblocking filter and configured to sequentially store a block, a corresponding block of which on a current edge is not input, in each memory of a plurality of memories including a vertical memory associated with the vertical edge deblocking filter, a horizontal memory associated with the horizontal edge deblocking filter, and a vertical and horizontal intermediate memory configured between the vertical memory and the horizontal memory and associated with both the vertical edge deblocking filter and the horizontal edge deblocking filter, out of blocks of an image for which a local decoding process is performed at a time of image coding, and read the block sequentially stored in each memory of the plurality of memories including the vertical memory, the horizontal memory, and the vertical and horizontal intermediate memory at timing when the corresponding block is input into one or more of the vertical edge deblocking filter and the horizontal edge deblocking filter, to perform a filter process;
a sample adaptive offset processing unit configured to perform a sample adaptive offset process by using a pixel of the block that has been subjected to the filter process by the deblocking filter; and
a coding unit configured to code the image by using the pixel that has been subjected to the sample adaptive offset process by the sample adaptive offset processing unit,
wherein the deblocking filter, the sample adaptive offset processing unit, and the coding unit are each implemented via at least one processor.

9. The image processing apparatus according to claim 8, wherein
the deblocking filter stores, in the vertical and horizontal intermediate memory, a block disposed on a left side of a current vertical edge, out of the blocks of the image for which the local decoding process is performed at the time of image coding, and reads the block stored in the vertical and horizontal intermediate memory at timing when a block disposed on a right side of the vertical edge is input, to perform the filter process.

10. The image processing apparatus according to claim 8, wherein
the deblocking filter stores, in the vertical and horizontal intermediate memory, a block disposed on an upper side of a current horizontal edge, out of the blocks of the image for which the local decoding process is performed at the time of image coding, and reads the block stored in the vertical and horizontal intermediate memory at timing when a block disposed on a lower side of the horizontal edge is input, to perform the filter process.

11. The image processing apparatus according to claim 8, wherein
the deblocking filter stores the block, the corresponding block of which on the current edge is not input, in the vertical and horizontal intermediate memory, out of the blocks of the image for which the local decoding process is performed at the time of image coding, and outputs a pixel on at least an uppermost line of the block to the sample adaptive offset processing unit.

12. The image processing apparatus according to claim 8, wherein sequentially storing the block comprises storing the block in the vertical memory while the corresponding block along a vertical edge is input into the vertical edge deblocking filter, inputting a vertical result of the vertical edge deblocking filter for the block to the vertical and horizontal intermediate memory, storing the vertical result for the block in the vertical and horizontal intermediate memory while each corresponding block along the vertical edge is input into the vertical edge deblocking filter until the corresponding block along a horizontal edge is input into the horizontal edge deblocking filter, inputting a horizontal result of the horizontal edge deblocking filter for the block to the horizontal memory, and storing the horizontal result for the block in the horizontal memory while each corresponding block along the horizontal edge is input into the horizontal edge deblocking filter.

13. An image processing method, implemented via at least one processor, the method comprising:
sequentially storing a block, a corresponding block of which on a current edge is not input, in each memory of a plurality of memories including a vertical memory associated with the vertical edge deblocking filter, a horizontal memory associated with the horizontal edge deblocking filter, and a vertical and horizontal intermediate memory configured between the vertical memory and the horizontal memory and associated with both a vertical edge deblocking filter and a horizontal edge deblocking filter, out of blocks of an image for which a local decoding process is performed at a time of image coding, and reading the block sequentially stored in each memory of the plurality of memories including the vertical memory, the horizontal memory, and the vertical and horizontal intermediate memory at timing when the corresponding block is input into one or more of the vertical edge deblocking filter and the horizontal edge deblocking filter, to perform a filter process, by an image processing apparatus;

performing a sample adaptive offset process by using a pixel of the block that has been subjected to the filter process, by the image processing apparatus; and coding the image by using the pixel that has been subjected to the sample adaptive offset process, by the image processing apparatus.

14. The image processing method according to claim 13, wherein sequentially storing the block comprises storing the block in the vertical memory while the corresponding block along a vertical edge is input into the vertical edge deblocking filter, inputting a vertical result of the vertical edge deblocking filter for the block to the vertical and horizontal intermediate memory, storing the vertical result for the block in the vertical and horizontal intermediate memory while each corresponding block along the vertical edge is input into the vertical edge deblocking filter until the corresponding block along a horizontal edge is input into the horizontal edge deblocking filter, inputting a horizontal result of the horizontal edge deblocking filter for the block to the horizontal memory, and storing the horizontal result for the block in the horizontal memory while each corresponding block along the horizontal edge is input into the horizontal edge deblocking filter.

* * * * *